United States Patent
Kim et al.

(10) Patent No.: US 11,781,981 B2
(45) Date of Patent: Oct. 10, 2023

(54) SPECIMEN INSPECTION APPARATUS AND SPECIMEN INSPECTION METHOD

(71) Applicant: ACTRO CO., LTD., Yongin-si (KR)

(72) Inventors: Hak Sung Kim, Seoul (KR); Gyung Hwan Oh, Seoul (KR); Dong Woon Park, Seoul (KR)

(73) Assignee: ACTRO CO., LTD., Yongin Si (KR)

( * ) Notice: Subject to any disclaimer, the term of this patent is extended or adjusted under 35 U.S.C. 154(b) by 314 days.

(21) Appl. No.: 17/282,433

(22) PCT Filed: Oct. 1, 2019

(86) PCT No.: PCT/KR2019/012782
§ 371 (c)(1),
(2) Date: Apr. 2, 2021

(87) PCT Pub. No.: WO2020/071716
PCT Pub. Date: Apr. 9, 2020

(65) Prior Publication Data
US 2021/0389238 A1 Dec. 16, 2021

(30) Foreign Application Priority Data
Oct. 2, 2018 (KR) .......... 10-2018-0117858

(51) Int. Cl.
*G01N 21/3581* (2014.01)
*G01N 21/88* (2006.01)
*G01N 21/956* (2006.01)

(52) U.S. Cl.
CPC ..... *G01N 21/3581* (2013.01); *G01N 21/8806* (2013.01); *G01N 21/95684* (2013.01)

(58) Field of Classification Search
CPC .............. C03C 17/23; G01N 21/3581; G01N 21/8806; G01N 21/95684; G01N 21/956; G01N 21/95607

(Continued)

(56) References Cited

U.S. PATENT DOCUMENTS 11,385,186 B2 * 7/2022 Oyama ................. G01N 22/02
2014/0183365 A1 7/2014 Kyriakis

FOREIGN PATENT DOCUMENTS

JP 2013-228329 A 11/2013
JP 2014-002024 A 1/2014

(Continued)

OTHER PUBLICATIONS

Office Action of KR 10-2018-0117858 dated Dec. 16, 2019.

(Continued)

*Primary Examiner* — Tri T Ton
(74) *Attorney, Agent, or Firm* — WTA Patents

(57) ABSTRACT

According to an embodiment of a specimen inspection apparatus, the specimen inspection apparatus may comprise: a radiation unit; a reflection unit; a focus adjusting unit; a reception unit; and a control unit. The specimen inspection apparatus may comprise: a radiation unit for emitting a terahertz wave; a reflection unit for changing the path of a terahertz wave emitted from the radiation unit; a focus adjusting unit for forming an irradiation region on a specimen according to the path of the terahertz wave; a reception unit for receiving individual terahertz waves obtained by reflection, by the specimen, of the terahertz wave irradiated onto the first region; and a control unit for controlling the distance between at least two elements among the plurality of elements, and detecting whether the specimen is defective, according to the reflectivity difference between the terahertz waves.

13 Claims, 14 Drawing Sheets

(58) Field of Classification Search
USPC ................. 356/237.1–237.6, 239.1–239.8
See application file for complete search history.

(56) References Cited

FOREIGN PATENT DOCUMENTS

| KR | 10-2013-0077221 A | 7/2013 |
| KR | 10-2015-0137097 A | 12/2015 |

OTHER PUBLICATIONS

Notice of Allowance of KR 10-2018-0117858 dated Apr. 7, 2020.
International Search Report for PCT/KR2019/012782 dated Jan. 13, 2020 [PCT/ISA/210].
Written Opinion for PCT/KR2019/012782 dated Jan. 13, 2020 [PCT/ISA/237].

* cited by examiner

SPECIMEN INSPECTION APPARATUS AND SPECIMEN INSPECTION METHOD

CROSS REFERENCE TO RELATED APPLICATIONS

This application is a National Stage of International Application No. PCT/KR2019/012782 filed Oct. 1, 2019, claiming priority based on Korean Patent Application No. 10-2018-0117858 filed Oct. 2, 2018.

TECHNICAL FIELD

Embodiments relate to a specimen inspection apparatus using a terahertz wave.

Embodiments also relate to a specimen inspection method using a terahertz wave.

BACKGROUND ART

As state-of-the-art industries such as the semiconductor industry develop currently, high-density and miniaturization technologies are getting attention, and thus development of a non-destructive inspection technology is also required.

A terahertz wave has excellent transmittance with respect to non-conductive materials excluding metals and has a characteristic that it is harmless to the human body due to lower energy than X-rays. Due to the characteristics of the terahertz wave, the terahertz wave can be applied to a non-destructive inspection technology.

Currently, research on an imaging technique using terahertz waves is actively underway. However, in order to apply the currently developed technology to an actual industry, there are limitations on resolution and an imaging speed.

DISCLOSURE

Technical Problem

Embodiments provide a specimen inspection apparatus and a specimen inspection method using a terahertz wave.

Embodiments provide a specimen inspection apparatus and a specimen inspection method which detect whether a specimen is defective using a terahertz wave.

Embodiments provide a specimen inspection apparatus and a specimen inspection method which form a plurality of irradiation regions on a specimen by changing a path of terahertz waves and determine whether the specimen is defective by receiving the terahertz waves reflected from the regions.

The problems to be solved by the present invention are not limited to the above-described problems, and problems not mentioned will be clearly understood by those skilled in the art to which the present invention pertains from the present specification and the accompanying drawings.

Technical Solution

According to an aspect of a specimen inspection apparatus, the specimen inspection apparatus includes an emission unit, a reflection unit, a focus adjusting unit, a reception unit, and a control unit. The specimen inspection apparatus may include an emission unit configured to emit terahertz waves; a reflection unit configured to change a path of the terahertz waves emitted from the emission unit; a focus adjusting unit configured to form a first region on a specimen along the path of the terahertz waves, wherein a distance between the reflection unit and the focus adjusting unit is a first distance, the first region include a second region and a third region, and the second region is spaced apart from the third region by a second distance; a reception unit configured to receive the terahertz waves, which are irradiated onto the first region and respectively reflected from the specimen; and a control unit configured to control at least one of the first distance and the second distance and detect whether the specimen is defective according to a difference between reflectivity of the terahertz waves, wherein, when the first distance ranges from 57 mm to 61 mm, the second region may have a diameter ranging from 64 mm to 67 mm, and the third region may respectively have appropriate diameter which refers to a diameter which allows the detection of whether or not the specimen is defective.

According to an aspect of a specimen inspection method, the specimen inspection method includes emitting, by an emission unit, terahertz waves; changing, by a reflection unit, a path of the terahertz waves emitted from the emission unit; forming, by a focus adjusting unit, a first region on a specimen using the terahertz waves, wherein a distance between the reflection unit and the focus adjusting unit is a first distance, the first region include a second region and a third region, and the second region is spaced apart from the third region by a second distance; receiving, by a reception unit, the terahertz waves, which are irradiated onto the first region and respectively reflected from the specimen; and controlling, by a control unit, at least one of the first distance and the second distance and detecting whether the specimen is defective according to a difference between reflectivity of the terahertz waves, wherein, when the first distance ranges from 57 mm to 61 mm, the second region may have a diameter ranging from 64 mm to 67 mm, and the third region may respectively have appropriate diameter which refers to a diameter which allows the detection of whether or not the specimen is defective.

The solutions for solving the problems of the present invention are not limited to the above-described solutions, and solutions not mentioned will be clearly understood by those skilled in the art to which the present invention pertains from the present specification and the accompanying drawings.

Advantageous Effects

A specimen inspection apparatus and a specimen inspection method according to the embodiments can emit a terahertz wave to a specimen and can detect whether the specimen is defective through the terahertz wave reflected from the specimen, and thus there is an effect in that a defective region formed on the specimen can be detected.

The specimen inspection apparatus and the specimen inspection method according to the embodiments can change a path of the terahertz wave through a reflection unit, the terahertz wave whose path is changed can form a plurality of regions on the specimen, and each of the regions can have an appropriate diameter having a resolution which allows the detection of whether or not the specimen is defective, and thus there is an effect in that whether the specimen is defective can be detected with a high resolution with respect to the specimen.

The specimen inspection apparatus and the specimen inspection method according to the embodiments can change the path of the terahertz wave through the reflection unit, the terahertz wave whose path is changed can form focuses on the same flat surface of the specimen through a focus adjusting unit, the terahertz wave can form a plurality of regions on the same flat surface of the specimen, and an appropriate diameter of each of the plurality of regions can be determined on the basis of at least one of a distance between the reflection unit and the focus adjusting unit and a distance between the plurality of regions, and thus there is an effect in that whether the specimen is defective can be detected with a high resolution through the plurality of regions, each having an appropriate diameter according to a size of the specimen.

The effects of the present invention are not limited to the above-described effects, and effects not mentioned will be clearly understood by those skilled in the art to which the present invention pertains from the present specification and the accompanying drawings.

MODES OF THE INVENTION

Figure 1:
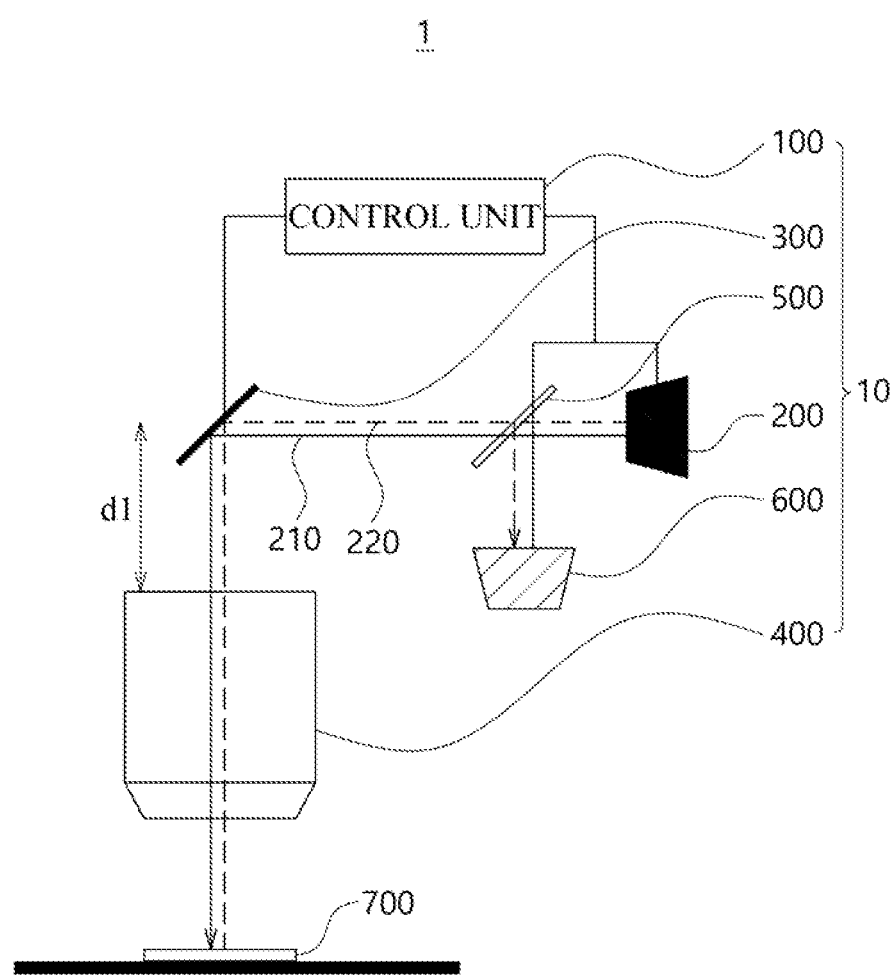
FIG. 1 is a diagram illustrating a specimen inspection system and a specimen inspection apparatus according to one embodiment.

Hereinafter, specific embodiments of the present invention will be described in detail with reference to the accompanying drawings. However, the spirit of the present invention is not limited to the disclosed embodiments, those skilled in the art who understand the spirit of the present invention can easily propose other regressive inventions or other embodiments falling within the scope of the present invention through addition, alteration, and deletion of other components within the scope of the same spirit, and these will also fall within the scope of the present invention.

In addition, components having the same function within the scope of the same spirit shown in the drawings of each embodiment will be described using the same reference numeral.

One embodiment of the present invention may provide a specimen inspection apparatus including an emission unit for emitting terahertz waves, a reflection unit for changing a path of the terahertz waves emitted from the emission unit, a focus adjusting unit for forming a first region on a specimen along the path of the terahertz waves, wherein a distance between the reflection unit and the focus adjusting unit is a first distance, the first region include a second region and a third region, and the second region is spaced apart from the third region by a second distance, a reception unit for receiving terahertz waves, which are irradiated onto the first region and respectively reflected from the specimen, and a control unit for controlling at least one of the first distance and the second distance and detecting whether the specimen is defective according to a difference between reflectivity of the terahertz waves, wherein, when the first distance ranges from 57 mm to 61 mm, the second region has a diameter ranging from 64 mm to 67 mm, and the third region respectively has appropriate diameter which refers to a diameter which allows the detection of whether or not the specimen is defective.

In addition, it is possible to provide a specimen inspection apparatus in which an appropriate diameter has a deviation ranging from 0.2% to 2% on the basis of a minimum value thereof.

In addition, it is possible to provide a specimen inspection apparatus in which the appropriate diameter of the third region ranges from 67.5 mm to 68.5 mm.

In addition, it is possible to provide a specimen inspection apparatus in which, when the first distance ranges from 58 mm to 60 mm, the appropriate diameter of the third region ranges from 67.5 mm to 68.5 mm or from 75.4 mm to 75.8 mm.

In addition, it is possible to provide a specimen inspection apparatus in which, when the first distance ranges from 59 mm to 60 mm, the appropriate diameter of the third region ranges from 67.5 mm to 68.5 mm or from 75.4 mm to 75.8 mm.

In addition, it is possible to provide a specimen inspection apparatus in which, when the first distance is 60 mm, the appropriate diameter of the third region ranges from 68 mm to 103 mm.

In addition, it is possible to provide a specimen inspection apparatus in which, when the first distance ranges from 60 mm to 61 mm, the appropriate diameter of the third region ranges from 102.5 mm to 102.8 mm.

In addition, it is possible to provide a specimen inspection apparatus in which a light source of the terahertz waves is a continuous-type or pulsed-type.

In addition, it is possible to provide a specimen inspection apparatus in which a wavelength of the terahertz wave ranges from 30 μm to 3 mm.

In addition, it is possible to provide a specimen inspection apparatus in which the second distance is determined based on an angle at which the reflection unit is rotated by the control unit.

In addition, it is possible to provide a specimen inspection apparatus in which the specimen is an electronic element or a transparent electrode, and the electronic element or the transparent electrode includes any one of a transparent polymer substrate, glass, and quartz which are coated with a metal material.

In addition, it is possible to provide a specimen inspection apparatus in which the metal material is at least one among indium tin oxide, indium zinc oxide, fluorine-doped tin oxide, and metal nanowires.

One embodiment of the present invention, may provide a specimen inspection method including emitting, by an emission unit, terahertz waves; changing, by a reflection unit, a path of the terahertz waves emitted from the emission unit; forming, by a focus adjusting unit, first region on a specimen using the terahertz waves, wherein a distance between the reflection unit and the focus adjusting unit is a first distance, the first region include a second region and a third region, and the second region is spaced apart from the third region by a second distance; receiving, by a reception unit, terahertz waves, which are irradiated onto the first region and respectively reflected from the specimen; and controlling, by a control unit, at least one of the first distance and the second distance and detecting whether the specimen is defective according to a difference between reflectivity of the terahertz waves, wherein, when the first distance ranges from 57 mm to 61 mm, the second region has a diameter ranging from 64 mm to 67 mm, and the third region respectively has an appropriate diameter which refers to a diameter which allows the detection of whether or not the specimen is defective.

Hereinafter, the specimen inspection apparatus and the specimen inspection method according to one embodiment of the present invention will be described.

FIG. 1 is a diagram illustrating a specimen inspection system 1 and a specimen inspection apparatus 10 according to one embodiment.

The specimen inspection system 1 may include the specimen inspection apparatus 10 and a specimen 700.

The specimen inspection system 1 may inspect the specimen 700 using the specimen inspection apparatus 10. The specimen inspection system 1 may inspect whether the specimen 700 is defective using the specimen inspection apparatus 10. The specimen inspection system 1 may detect a defective region included in the specimen 700 using the specimen inspection apparatus 10.

The specimen inspection apparatus 1 may include a control unit 100, an emission unit 200, a reflection unit 300, a focus adjusting unit 400, a beam splitter 500, and a reception unit 600.

The control unit 100 may control the specimen inspection apparatus 1. The control unit 100 may control at least one among the emission unit 200, the reflection unit 300, the focus adjusting unit 400, the beam splitter 500, and the reception unit 600. The control unit 100 may control a rotation angle of the reflection unit 300. The control unit 100 may control a distance between the reflection unit 300 and the focus adjusting unit 400. The control unit 100 may include one or more among a central processing unit (CPU), a random access memory (RAM), a graphic processing unit (GPU), one or more microprocessors, and other electronic components capable of processing input data according to a predetermined logic. For example, the control unit 100 may deploy a specimen inspection process which is executable in the specimen inspection apparatus, which will be described below, in a RAM and perform various types of processing such as controlling of at least one among the emission unit 200, the reflection unit 300, the focus adjusting unit 400, the beam splitter 500, and the reception unit 600 according to the deployed program.

The specimen inspection apparatus 1 may be located to be spaced apart from the specimen 700. The specimen inspection apparatus 1 may be located to be spaced apart from the specimen 700 in a direction corresponding to the specimen 700. The specimen inspection apparatus 1 may be located to be spaced apart from the specimen 700 such that the focus adjusting unit 400 corresponds to the specimen 700.

The emission unit 200 may be located to be spaced apart from the specimen 700. The emission unit 200 may be located to be perpendicularly spaced apart from the specimen 700.

The reflection unit 300 may be located to be spaced apart from the specimen 700. The reflection unit 300 may be located to be spaced apart from the specimen 700 in a direction corresponding to the specimen 700. The reflection unit 300 may be located between the emission unit 200 and the specimen 700. The emission unit 200 and the specimen 700 may be located in a perpendicular relationship based on the reflection unit 300, The reflection unit 300 may be located on a path through which a terahertz wave 210 emitted from the emission unit 200 is irradiated to the specimen 700.

The focus adjusting unit 400 may be located to be spaced apart from the specimen 700. The focus adjusting unit 400 may be located to be spaced apart from the specimen 700 in a direction corresponding to the specimen 700. The focus adjusting unit 400 may be located on the path through which the terahertz wave 210 emitted from the emission unit 200 is irradiated to the specimen 700.

The focus adjusting unit 400 may be located between the reflection unit 300 and the specimen 700. The focus adjusting unit 400 may be located to be spaced apart from the reflection unit 300 by a first distance d1. The first distance d1 may be varied according to a size of the specimen. The first distance d1 may be varied such that a plurality of irradiation regions formed on the specimen 700 have appropriate diameters.

The beam splitter 500 may be located to be spaced apart from the specimen 700. The beam splitter 500 may be located between the emission unit 200 and the specimen 700. The beam splitter 500 may be located on the path of the terahertz wave 210 emitted from the emission unit 200 to the specimen 700. The beam splitter 500 may be located on the path of the terahertz wave 210 emitted from the emission unit 200 to the reflection unit 300.

The reception unit 600 may be located to be spaced apart from the beam splitter 500. The reception unit 600 may be located on a path through which a reflected terahertz wave 220, which is reflected from the specimen 700, is reflected by the beam splitter 500.

The specimen 700 may be located on a tray. The specimen 700 may be located on a tray in a direction corresponding to the specimen inspection apparatus 1. The specimen 700 may be moved to a position corresponding to the specimen inspection apparatus 1.

Hereinafter, each component will be described.

Referring to FIG. 1, the emission unit 200, the reflection unit 300, the focus adjusting unit 400, the beam splitter 500, and the reception unit 600 will be described.

The emission unit 200 may emit a terahertz wave. The terahertz wave 210 emitted from the emission unit 200 may include a plurality of waves which are spaced apart from each other by a predetermined interval. A wavelength of the terahertz wave 210 emitted from the emission unit 200 may range from 30 μm to 3 mm. The terahertz wave 210 may be a continuous or pulsed wave. A light source of the terahertz wave 210 may be a single light source or a plurality of light sources. A frequency of the terahertz wave 210 may range from 0.1 THz to 10 THz. The emission unit 200 may emit a terahertz wave within the above frequency range, and the terahertz wave may have stronger transmittance than visible light or infrared light. In addition, since the terahertz wave 210 emitted from the emission unit 200 may be used in the presence of external light, it is possible to detect whether the specimen 700 is defective without a separate process of blocking the external light.

The reflection unit 300 may reflect the terahertz wave 210 emitted from the emission unit 200. The reflection unit 300 may reflect the terahertz wave 210 emitted from the emission unit 200 to allow the terahertz wave 210 to be irradiated to the focus adjusting unit 400. The reflection unit 300 may be rotated at a predetermined angle. The reflection unit 300 may be rotated at a predetermined angle to change the path of the terahertz wave 210 emitted from the emission unit 200. The reflection unit 300 may change the path of the terahertz wave 210 emitted from the emission unit 200 to allow the terahertz wave 210 to be irradiated at different positions of the focus adjusting unit 400.

The reflection unit 300 may be provided as a plurality of reflection units. When a plurality of reflection units 300 are provided, the reflection units 300 may be located to be spaced apart from each other in a direction corresponding to each other. The plurality of reflection units 300 may be located on the path through which the terahertz wave 210 emitted from the emission unit 200 is irradiated to the specimen 700. The reflection unit 300 may be a galvano mirror. At least one among the plurality of reflection units 300 may be a galvano mirror.

The reflection unit 300 may change the path of the terahertz wave 210 emitted from the emission unit 200 to form a plurality of irradiation regions on the specimen 700. The reflection unit 300 may change the path of the terahertz wave 210 emitted from the emission unit 200 to form a plurality of irradiation regions having a predetermined resolution with respect to an inspection region included in the specimen 700. Thus, accuracy of detecting whether the specimen 700 is defective may be improved.

The focus adjusting unit 400 may transmit the terahertz wave 210 reflected from the reflection unit 300. The focus adjusting unit 400 may transmit the terahertz wave 210 which is incident after the path is changed by the reflection unit 300. The focus adjusting unit 400 may reflect or refract at least a part of the terahertz wave 210 reflected from the reflection unit 300. The focus adjusting unit 400 may allow the terahertz wave 210, which is reflected from the reflection unit 300, to be irradiated to the specimen 700. The focus adjusting unit 400 may adjust the terahertz wave 210, whose path is changed by the reflection unit 300, to be perpendicularly irradiated to the specimen 700. The focus adjusting unit 400 may adjust a focus of at least a part of the terahertz wave 210 reflected from the reflection unit 300. The focus adjusting unit 400 may adjust a focus of at least a part of the terahertz wave 210 whose the path is changed by the reflection unit 300. The focus adjusting unit 400 may adjust the focus of at least a part of the terahertz wave 210, whose path is changed by the reflection unit 300, to correspond to the specimen 700. The focus adjusting unit 400 may adjust the focus of the terahertz wave 210, whose path is changed by the reflection unit 300, and may be located coplanar with the specimen 700. The focus adjusting unit 400 may allow the terahertz wave 210 to be vertically irradiated to the specimen 700 irrespective of a propagation path of the terahertz wave 210 reflected from the reflection unit 300.

The focus adjusting unit 400 may include a plurality of lenses. The focus adjusting unit 400 may be a telecentric f-theta lens. The focus adjusting unit 400 may include a plurality of lenses which are located to be spaced apart from each other by a predetermined distance. The focus adjusting unit 400 may include four lenses which are the same or different from each other and are located to be spaced apart from each other by a predetermined distance. The focus adjusting unit 400 may include two or more spherical lenses or one aspherical lens.

The beam splitter 500 may reflect or transmit a part of incident light. The beam splitter 500 may transmit a part of light emitted from the emission unit 200, the transmitted light may be reflected by the specimen 700, and a part of the reflected light may be reflected by the beam splitter 500 to be received by the reception unit 600. The beam splitter 500 may allow the emission unit 200 and the reception unit 600 to be located above the specimen 700.

The reception unit 600 may receive the reflected terahertz wave 220 which is the terahertz wave 210 emitted from the emission unit 200 and reflected by the specimen 700. The reflected terahertz wave 220 reflected from a defective region included in the specimen 700 may be received by the reception unit 600.

The terahertz wave 210 emitted from the emission unit 200 may be irradiated toward the specimen 700. The terahertz wave 210 emitted from the emission unit 200 may be irradiated to the beam splitter 500. At least a part of light emitted from the emission unit 200 may pass through the beam splitter 500. The light passing through the beam splitter 500 from the emission unit 200 may be irradiated to the reflection unit 300. At least a part of the light passing through the beam splitter 500 from the emission unit 200 may be reflected by the reflection unit 300. A path of at least a part of the light passing through the beam splitter 500 from the emission unit 200 may be changed by the reflection unit 300, and the at least a part of the light may be reflected by the reflection unit 300. At least a part of the light reflected by the reflection unit 300 may be irradiated to the focus adjusting unit 400. At least a part of the light reflected by the reflection unit 300 may pass through the focus adjusting unit 400. At least a part of the light, whose path is changed by the reflection unit 300 and which is reflected by the reflection unit 300, may pass through the focus adjusting unit 400. A focus of at least a part of the light reflected by the reflection unit 300 may be adjusted by the focus adjusting unit 400, and the at least a part of the light may be irradiated to the specimen 700. At least a part of the light, whose focus is adjusted by the focus adjusting unit 400 and which is irradiated by the focus adjusting unit 400, may be irradiated on the same flat surface of the specimen 700. The at least a part of the light, whose focus is adjusted by the focus adjusting unit 400 and which is irradiated by the focus adjusting unit 400, may be vertically irradiated to the specimen 700. At least a part of the light irradiated to the specimen 700 may be reflected from the specimen 700. At least a part of the light irradiated to the specimen 700 may be reflected from a surface of the specimen 700. At least a part of the light reflected from the specimen 700 may pass through the focus adjusting unit 400. At least a part of the light passing through the focus adjusting unit 400 may be reflected by the reflection unit 300. A path through which the light passing through the focus adjusting unit 400 is irradiated to the reflection unit 300 may coincide with the path through which the light reflected from the reflection unit 300 is irradiated to the focus adjusting unit 400. The light reflected from the reflection unit 300 may be irradiated to the reception unit 600 by the beam splitter 500. The reception unit 600 may receive at least a part of the light reflected from the specimen 700.

The specimen 700 may be provided as one specimen 700 or a plurality of specimens 700. The specimen 700 may be a transparent electrode or an electronic element. A surface of the specimen 700 may be coated with a metal material. The metal material may include indium tin oxide (ITO), indium zinc oxide (IZO), fluorine-doped tin oxide, metal nanowires (silver nanowires, copper nanowires, nickel nanowires, or the like), or the like. The specimen 700 may be a transparent polymer substrate, a transparent electrode in which glass or quartz is coated with the metal material, or an electronic element.

Figure 2:
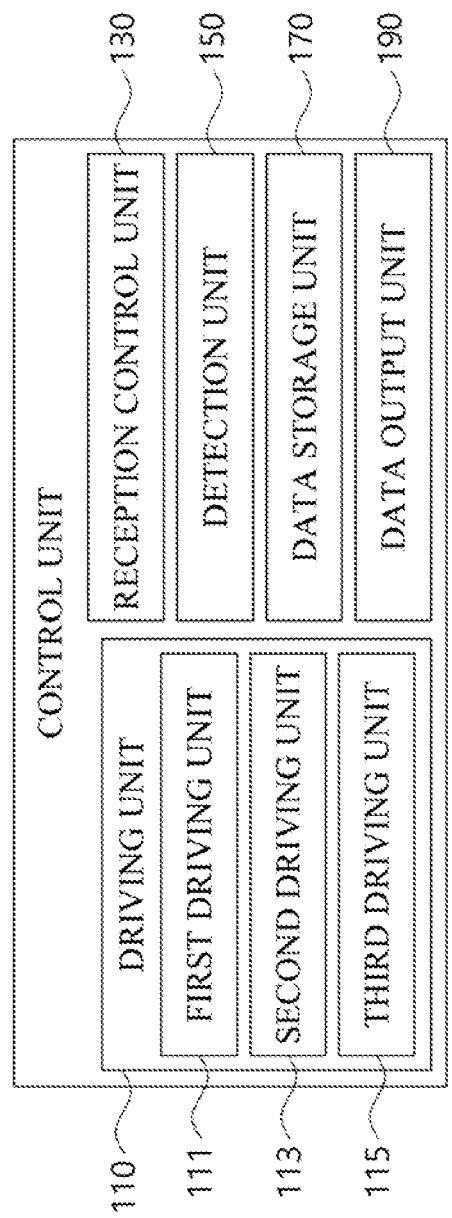
FIG. 2 is a block diagram illustrating a control unit for controlling the specimen inspection apparatus according to one embodiment.

FIG. 2 is a block diagram illustrating the control unit 100 for controlling the specimen inspection apparatus 10 according to one embodiment. Referring to FIG. 2, the control unit 100 may include a driving unit 110, a reception control unit 130, a detection unit 150, a data storage unit 170, and a data output unit 190. The control unit 100 may include one or more among a CPU, a RAM, a GPU, one or more microprocessors, and other electronic components capable of processing input data according to a predetermined logic. For example, the control unit 100 may perform various types of processing such as controlling at least one among the driving unit 110, the reception control unit 130, the detection unit 150, the data storage unit 170, and the data output unit 190, and the like, thereby enabling a specimen inspection process, which is executable by the specimen inspection apparatus 10, to be deployed in the RAM.

The control unit 100 will be described with reference to FIGS. 1 and 2.

The driving unit 110 may drive the specimen inspection system 1. The driving unit 110 may drive the specimen inspection apparatus 10. The driving unit 110 may include a first driving unit 111, a second driving unit 113, and a third driving unit 115.

The first driving unit 111 may control the emission unit 200 to emit terahertz waves. When the terahertz wave 210 emitted from the emission unit 200 corresponds to the specimen 700, the first driving unit 111 may control the emission unit 200 to emit the terahertz wave 210.

The second driving unit 113 may control an angle at which the reflection unit 300 is rotated. The second driving unit 113 may control the angle at which the reflection unit 300 is rotated according to a size of the specimen 700. The second driving unit 113 may control the reflection unit 300 to be rotated at a predetermined angle. The second driving unit 113 may control the reflection unit 300 to be rotated at angles with predetermined intervals. The second driving unit 113 may control the reflection unit 300 to be rotated at a continuous angle. The second driving unit 113 may control the reflection unit 300 to be rotated based on a direction in which the reflection unit 300 corresponds to the specimen. The second driving unit 113 may control the reflection unit 300 such that the reflection unit 300 is rotated based on the direction in which the reflection unit 300 corresponds to the specimen and thus a plurality of irradiation regions are formed on the specimen 700. The second driving unit 113 may control the reflection unit 300 such that the reflection unit 300 is rotated based on the direction in which the reflection unit 300 corresponds to the specimen so that a plurality of irradiation regions are formed at different positions on the specimen 700. The second driving unit 113 may control the reflection unit 300 to be rotated in the range of one degree to twenty degrees based on the direction in which the reflection unit 300 corresponds to the specimen. The second driving unit 113 may control the reflection unit 300 to be preferably rotated in the range of one degree to four degrees and at twenty degrees based on the direction in which the reflection unit 300 corresponds to the specimen.

The third driving unit 115 may control a distance between the reflection unit 300 and the focus adjusting unit 400. The third driving unit 115 may control a first distance d1, which is a distance between the reflection unit 300 and the focus adjusting unit 400, according to the size of the specimen 700. The third driving unit 115 may control the first distance d1 according to sizes of the plurality of irradiation regions formed on the specimen 700. The third driving unit 115 may control the first distance d1 so as to adjust the sizes of the plurality of irradiation regions formed on the specimen 700. The third driving unit 115 may control the first distance d1 to be in a range from 57 mm to 61 mm.

The reception control unit 130 may control the reception unit 600 to receive terahertz waves emitted from the emission unit 200. The reception control unit 130 may control the reception unit 600 to receive the reflected terahertz wave 220 which is the terahertz wave 210 emitted from the emission unit 200 and reflected from the specimen 700. The reception control unit 130 may control the reception unit 600 to receive the reflected terahertz wave 220 which is the terahertz wave 210 emitted from the emission unit 200 and reflected from the surface of the specimen 700. The reception control unit 130 may detect an intensity of the terahertz wave on the basis of the terahertz wave received by the reception unit 600. The reception control unit 130 may detect a variation in intensity of the terahertz wave on the basis of the terahertz wave received by the reception unit 600. The reception control unit 130 may detect a variation in intensity of the terahertz wave for each region of the specimen on the basis of the terahertz wave received by the reception unit 600. The reception control unit 130 may detect coordinates of a region in which the variation in intensity of the terahertz wave appears among regions of the specimen.

The data storage unit 170 may store data on the intensity of the terahertz wave. The data storage unit 170 may store data on the variation in intensity of the terahertz wave. The data storage unit 170 may store data on the variation in intensity of the terahertz wave for each region of the specimen. The data storage unit 170 may store data on coordinates of a region in which the variation in intensity of the terahertz wave appears among the regions of the specimen.

The data output unit 190 may output the data stored in the data storage unit 170. The data output unit 190 may output data on whether the specimen is defective, which is stored in the data storage unit 170. The data output unit 190 may output data on coordinates of a defective region of the specimen, which is stored in the data storage unit 170.

Figure 3:
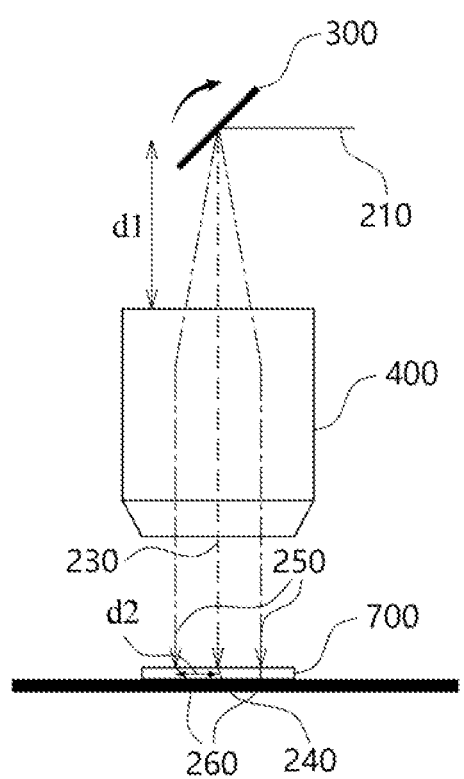
FIG. 3 is a diagram illustrating a path of terahertz waves, which is emitted from an emission unit of the specimen inspection apparatus, changed by a reflection unit according to one embodiment.

FIG. 3 is a diagram illustrating that a path of the terahertz wave 210 emitted from the emission unit 200 of the specimen inspection apparatus 10 is changed by the reflection unit 300 according to one embodiment.

Referring to FIGS. 1 to 3, a description will be made in which the reflection unit 300 of the specimen inspection apparatus 10 changes the path of the terahertz wave 210 emitted from the emission unit 200, and the terahertz wave 210 forms the plurality of irradiation regions on the specimen 700 along the changed path. The plurality of irradiation regions may be located to be spaced apart from each other by a second distance d2. The second distance d2 may range from 2 mm to 10 mm Preferably, the second distance d2 may range from 2.3 mm to 9.5 mm.

The reflection unit 210 may be rotated at a predetermined angle. The reflection unit 210 may be rotated in different directions according to a predetermined angle. The reflection unit 210 may be rotated in at least one direction of left and right directions according to a predetermined angle. The reflection unit 210 may be rotated based on a path through which the terahertz wave 210 emitted from the emission unit 200 is vertically incident on the specimen 700. The reflection unit 210 may be rotated in different directions according to a predetermined angle based on the path through which the terahertz wave 210 emitted from the emission unit 200 is vertically incident on the specimen 700.

When a rotation angle of the reflection unit 210 is zero degrees, the terahertz wave 210 emitted from the emission unit 200 may be irradiated in a direction of a first terahertz wave 230 with respect to the specimen. When a rotation angle of the reflection unit 210 is a predetermined angle, the terahertz wave 210 emitted from the emission unit 200 may be irradiated in a direction of a second terahertz wave 250 with respect to the specimen. At least one of the first terahertz wave 230 and the second terahertz wave 250 may be irradiated in a vertical direction with respect to the specimen. The first terahertz wave 230 and the second terahertz wave 250 may be irradiated onto regions located to be spaced apart from each other. The first terahertz wave 230 and the second terahertz wave 250 may be irradiated onto regions located to be spaced apart from each other by the second distance d2.

The first terahertz wave 230 may be irradiated onto the specimen 700 to form a first region 240. The second terahertz wave 250 may be irradiated onto the specimen 700 to form a second region 260. The first region 240 and the second region 260 may be located to be spaced apart from each other. The first region 240 and the second region 260 may be located to be spaced apart from each other by the second distance d2. At least a region of the first region 240 may overlap at least a region of the second region 260.

In the specimen inspection apparatus 10, as the path of the terahertz wave 210 emitted from the emission unit 200 is changed by the reflection unit 300, even when an irradiation direction of the terahertz wave 210 emitted from the emission unit 200 is fixed, a plurality of irradiation regions may be formed on the specimen 700. In the specimen inspection apparatus 10, even when the emission unit 200 does not irradiate terahertz waves 210 having a plurality of irradiation directions, a terahertz wave 210 propagating in various paths may be formed by the reflection unit 300 so that the entire region of the specimen 700 may be inspected at a time. In addition, in the specimen inspection apparatus 10, since the intensity of the terahertz wave 210 emitted from the emission unit 200 may be similarly maintained with respect to various irradiation regions due to the reflection unit 300, the entire region of the specimen 700 may be inspected with a relatively uniform intensity.

Figure 4:
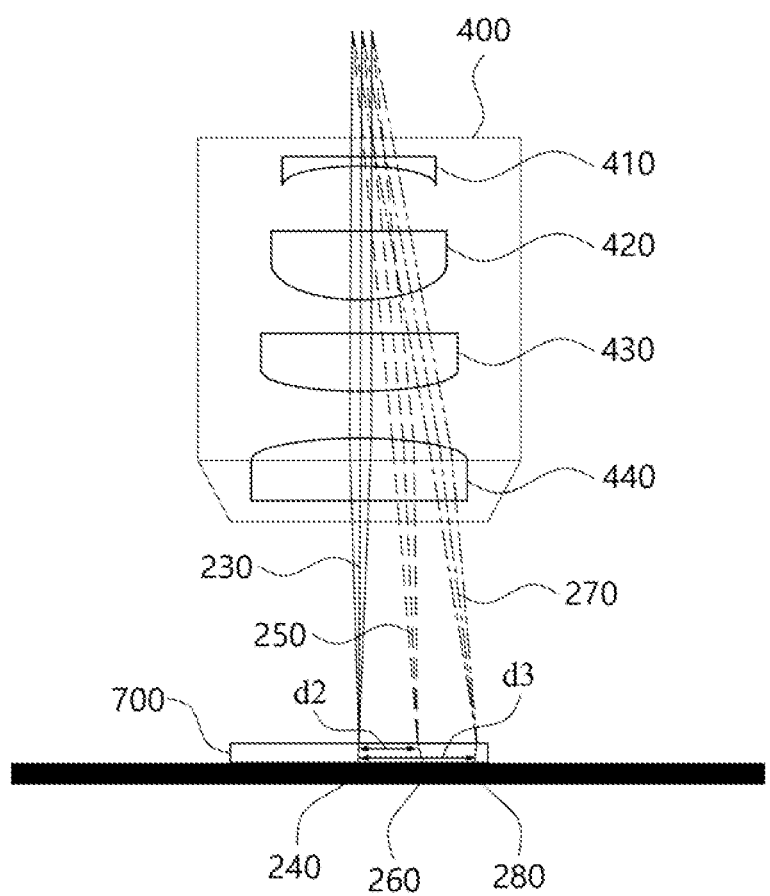
FIG. 4 is a diagram illustrating that the terahertz waves whose paths are changed by the reflection unit of the specimen inspection apparatus form focus on the same flat surface of the specimen due to a focus adjusting unit according to one embodiment.

FIG. 4 is a diagram illustrating that the terahertz waves whose paths are changed by the reflection unit of the specimen inspection apparatus form focus on the same flat surface of the specimen due to a focus adjusting unit according to one embodiment.

Referring to FIGS. 1 to 4, a description will be made in which the focus adjusting unit 400 adjusts focuses of terahertz waves incident from the emission unit 200 to different paths by the reflection unit 300.

The focus adjusting unit 400 may include a plurality of lenses. The focus adjusting unit 400 may include at least one among a first lens 410, a second lens 420, a third lens 430, and a fourth lens 440 which are located to be spaced apart from each other by a predetermined distance. The focus adjusting unit 400 may include at least one among a first lens 410, a second lens 420, a third lens 430, and a fourth lens 440 which are the same or different from each other and are located to be spaced apart from each other by a predetermined distance. At least one among the first lens 410, the second lens 420, the third lens 430, and the fourth lens 440 may be a telecentric f-theta lens.

The path of the terahertz wave 210 emitted from the emission unit 200 may be changed by the reflection unit 300 to form the first terahertz wave 230, the second terahertz wave 250, and a third terahertz wave 270 which are irradiated in different directions. The second terahertz wave 250 and the third terahertz wave 270 may be irradiated onto regions located to be spaced apart from each other by a predetermined distance based on the first terahertz wave 230. The second terahertz wave 260 and the third terahertz wave 270 may be irradiated onto regions located to be spaced apart from the first terahertz wave 230 by the second distance d2 and a third distance d3, respectively. A central line of the second terahertz wave 260 and a central line of the third terahertz wave 270 may be irradiated onto regions located to be spaced apart from the first terahertz wave 230 by the second distance d2 and the third distance d3, respectively.

The focus adjusting unit 400 may adjust a focus of at least one among the first terahertz wave 230, the second terahertz wave 250, and the third terahertz wave 270. The focus adjusting unit 400 may adjust the focus of at least one among the first terahertz wave 230, the second terahertz wave 250, and the third terahertz wave 270 so as to vertically irradiate the at least one among the first terahertz wave 230, the second terahertz wave 250, and the third terahertz wave 270 to the specimen 700. The focus adjusting unit 400 may adjust the focus of at least one among the first terahertz wave 230, the second terahertz wave 250, and the third terahertz wave 270 to correspond to the specimen 700. The focus adjusting unit 400 may adjust the focus of at least one among the first terahertz wave 230, the second terahertz wave 250, and the third terahertz wave 270 to correspond to the same flat surface of the specimen 700.

Regions to which the first terahertz wave 230, the second terahertz wave 250, and the third terahertz wave 270 are irradiated may be the first region 240, the second region 260, and a third region 280. Regions in which the focuses of the first terahertz wave 230, the second terahertz wave 250, and the third terahertz wave 270 are formed may be the first region 240, the second region 260, and the third region 280, respectively. The first region 240, the second region 260, and the third region 280 may be located on the specimen 700. The first region 240, the second region 260, and the third region 280 may be located to be spaced apart from each other on the specimen 700. The second region 260 and the third region 280 may be located to be spaced apart from the first region 240 by the second distance d2 and the third distance d3, respectively. The first region 240, the second region 260, and the third region 280 may be regions in which the focuses of the first terahertz wave 230, the second terahertz wave 250, and the third terahertz wave 270 are formed, and the second region 260 and the third region 280 may be located to be spaced apart from the first region 240 by the second distance d2 and the third distance d3, respectively. At least some regions of the first region 240, the second region 260, and the third region 280 may overlap.

The terahertz wave 210 emitted from the emission unit 200 may include a plurality of waves which are spaced apart from each other by a predetermined interval. At least one among the first terahertz wave 230, the second terahertz wave 250, and the third terahertz wave 270 may include a plurality of waves which are spaced apart from each other by a predetermined interval. Focuses of the plurality of waves, which are spaced apart from each other by a predetermined interval, may be adjusted by the focus adjusting unit 400.

The plurality of waves, which are spaced apart from each other by a predetermined interval, may be adjusted to converge on a single focus by the focus adjusting unit 400. The plurality of waves, which are spaced apart from each other by a predetermined interval, may be adjusted to converge on a single focus by the focus adjusting unit 400, thereby forming an irradiation region on the specimen 700.

In the specimen inspection apparatus 10, the focus adjusting unit 400 may adjust the focus of the terahertz wave 210 so that a terahertz wave having the greatest intensity may be irradiated to an irradiation region formed on the specimen 700. The specimen inspection apparatus 10 may allow the focus adjusting unit 400 to match the irradiation region formed on the specimen 700 to the focus, thereby inspecting whether the specimen 700 is defective with a high resolution. In the specimen inspection apparatus 10, since the focus adjusting unit 400 inspects whether the specimen 700 is defective with a high resolution, accuracy of determining whether the specimen 700 is defective may be improved.

Figure 5:
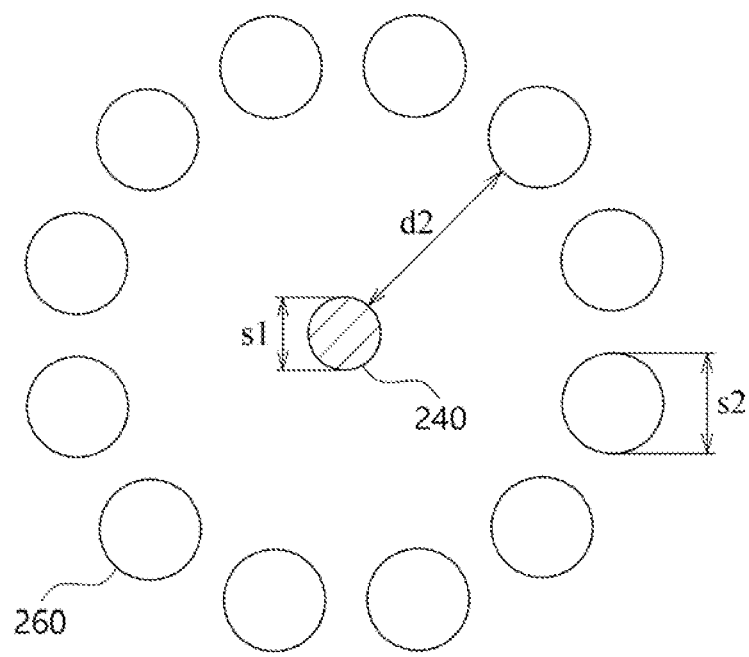
FIG. 5 is a diagram illustrating a plurality of regions formed on the specimen by emitting the terahertz waves in the specimen inspection apparatus according to one embodiment.

FIG. 5 is a diagram illustrating a plurality of regions formed on the specimen by emitting the terahertz waves in the specimen inspection apparatus according to one embodiment.

Referring to FIGS. 1 to 5, a description will be made in which the first terahertz wave 230 and the second terahertz wave 250 form the first region 240 and the second region 260 on the specimen 700, respectively, and a description of an appropriate diameter of the irradiation region will be made.

The first region 240 and the second region 260 may have a first diameter s1 and a second diameter s2, respectively. The first region 240 and the second region 260 may be located to be spaced apart from each other by the second distance d2. The second region 260 may be a plurality of regions, each of which is spaced the second distance d2 from the first region 240 that is located at a center. The plurality of second regions 260 may be located to be spaced the second distance d2 from the first region 240 at predetermined intervals. The plurality of second regions 260 may be consecutively located to be spaced apart from the first region 240 by the second distance d2.

The first diameter s1 and the second diameter s2 may be varied as at least one of the first distance d1 and the second distance d2 is varied. Each of the first diameter s1 and the second diameter s2 may be an appropriate diameter. The appropriate diameter may be a diameter allowing the detection of whether or not the specimen 700 is defective. The appropriate diameter may be a diameter having a resolution for detecting whether the specimen 700 is defective. The resolution for detecting whether the specimen 700 is defective may be a case in which at least one of the first diameter s1 and the second diameter s2 has a minimum value. The appropriate diameter may be a diameter having a deviation ranging from 0.2% to 2% on the basis of the minimum value of the diameter.

At least a partial region of the first region 240 having the first diameter d1 may overlap at least a partial region of the second region 260 having the second diameter d2. A region allowing the detection of whether or not the specimen 700 is defective may include both the first region 240 and the second region 260.

The specimen inspection apparatus 10 may irradiate terahertz waves onto the first region 240 and the second region 260, each having an appropriate diameter, on the specimen 700 and perform inspection on the specimen 700 with a high resolution. In the specimen inspection apparatus 10, at least partial regions of the first region 240 and the second region 260, each having an appropriate diameter, overlap each other, and thus whether the entire region of the specimen 700 is defective may be detected with a high resolution at a time.

FIGS. 6 to 9 are diagrams showing experimental values for sizes of the plurality of regions formed on the specimen in the specimen inspection apparatus according to one embodiment.

Referring to FIGS. 1 to 9, appropriate diameters of the first region 240, the second region 260, and the third region 280 will be described.

Figure 6:
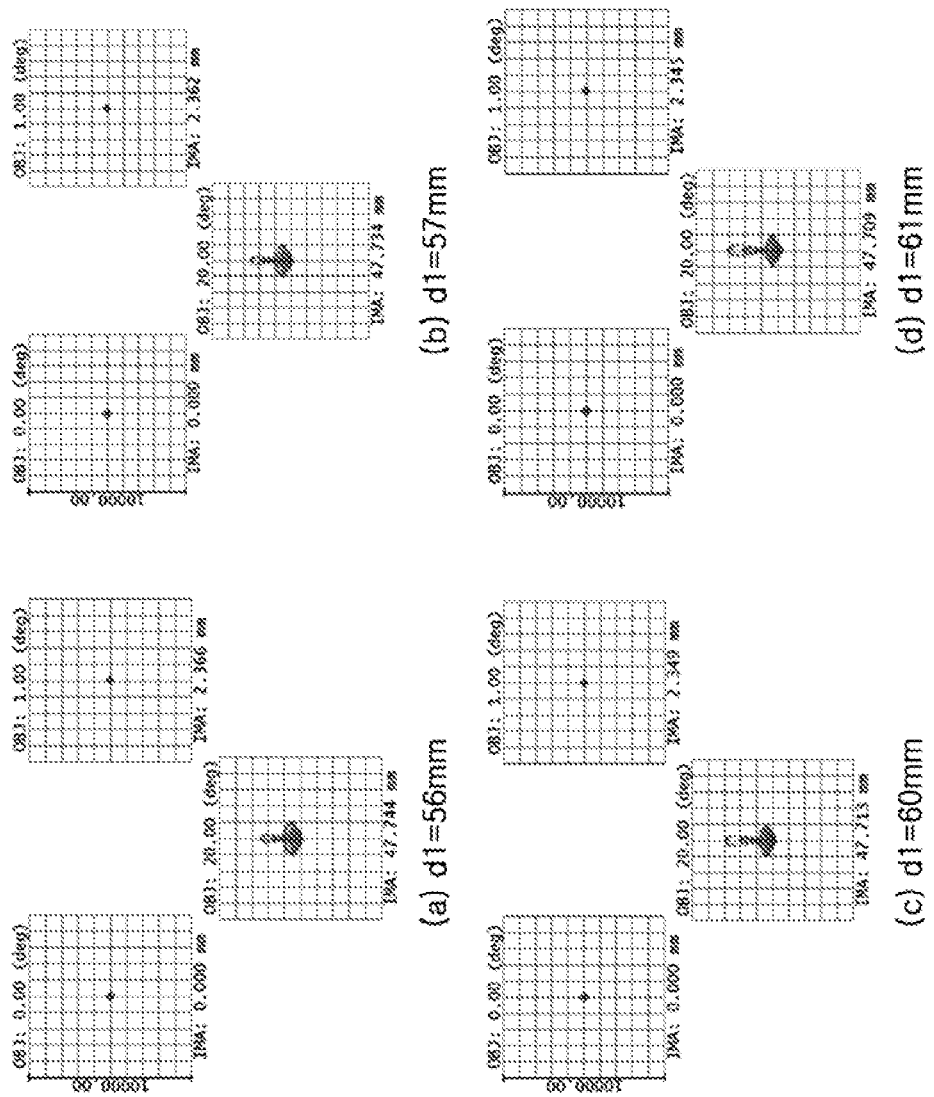
FIGS. 6 to 9 are diagrams showing experimental values for sizes of the plurality of regions formed on the specimen in the specimen inspection apparatus according to one embodiment.

FIG. 6 is a diagram illustrating, when the second distance d2 from the first region 240 is in a range from 2 mm to 2.5 mm, diameters of the first region 240, the second region 260, and the third region 280. FIG. 6 is a diagram illustrating, when the reflection unit 300 is rotated at one degree and twenty degrees based on a direction corresponding to the specimen, diameters of the first region 240, the second region 260, and the third region 280. Table 1 shows the diameters of the first region 240, the second region 260, and the third region 280 according to the first distance d1 shown in FIG. 6.

TABLE 1

| RMS radius (mm) | First region | Second region | Third region |
| --- | --- | --- | --- |
| d1 = 56 mm | 66.087 | 68.9 | 929.907 |
| d1 = 57 mm | 65.146 | 67.946 | 953.511 |
| d1 = 60 mm | 65.831 | 68.384 | 1039.53 |
| d1 = 61 mm | 67.213 | 69.623 | 1073.19 |

Figure 7:
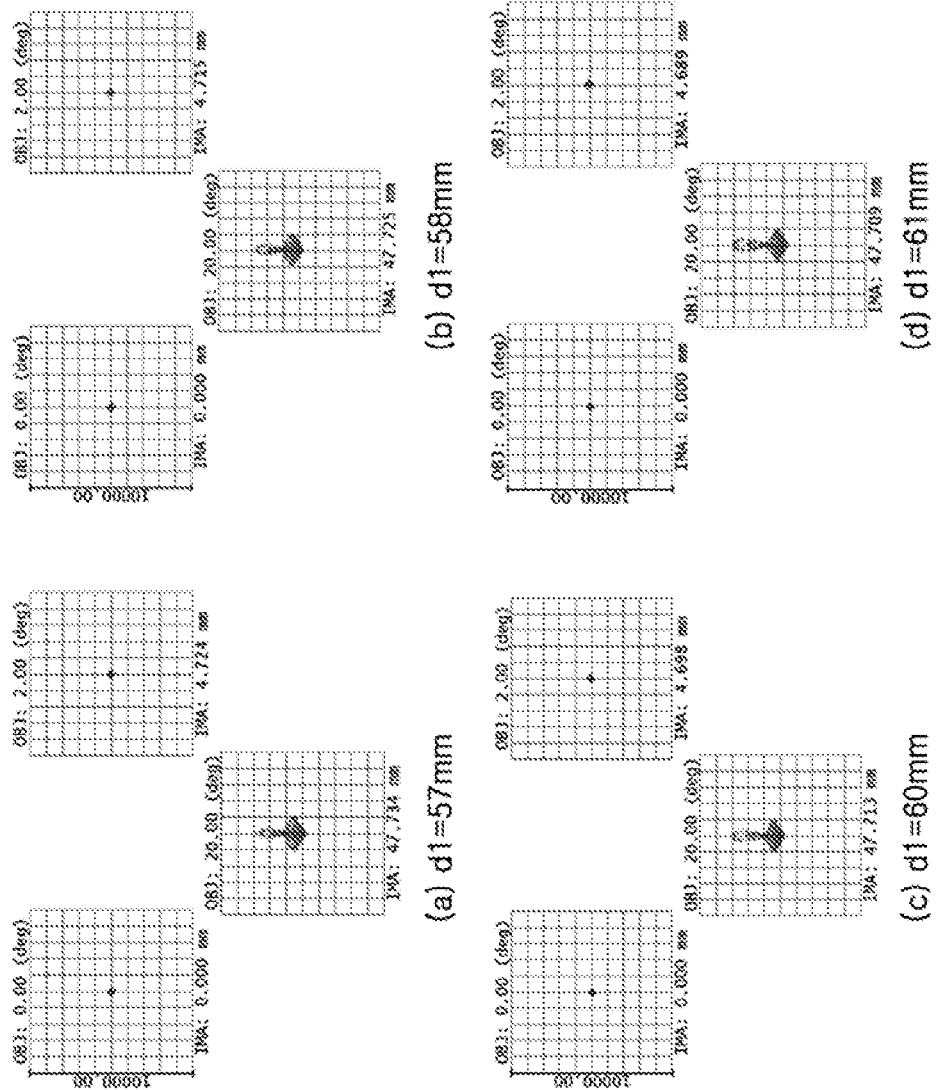

FIG. 7 is a diagram illustrating, when the second distance d2 from the first region 240 is in a range from 4.5 mm to 5 mm, diameters of the first region 240, the second region 260, and the third region 280. FIG. 7 is a diagram illustrating, when the reflection unit 300 is rotated at two degrees and twenty degrees based on the direction corresponding to the specimen, diameters of the first region 240, the second region 260, and the third region 280. Table 2 shows the diameters of the first region 240, the second region 260, and the third region 280 according to the first distance d1 shown in FIG. 6.

TABLE 2

| RMS radius (mm) | First region | Second region | Third region |
| --- | --- | --- | --- |
| d1 = 57 mm | 65.146 | 75.964 | 953.51 |
| d1 = 58 mm | 64.786 | 75.426 | 979.667 |
| d1 = 60 mm | 65.831 | 75.764 | 1039.53 |
| d1 = 61 mm | 67.213 | 76.636 | 1073.19 |

Figure 8:
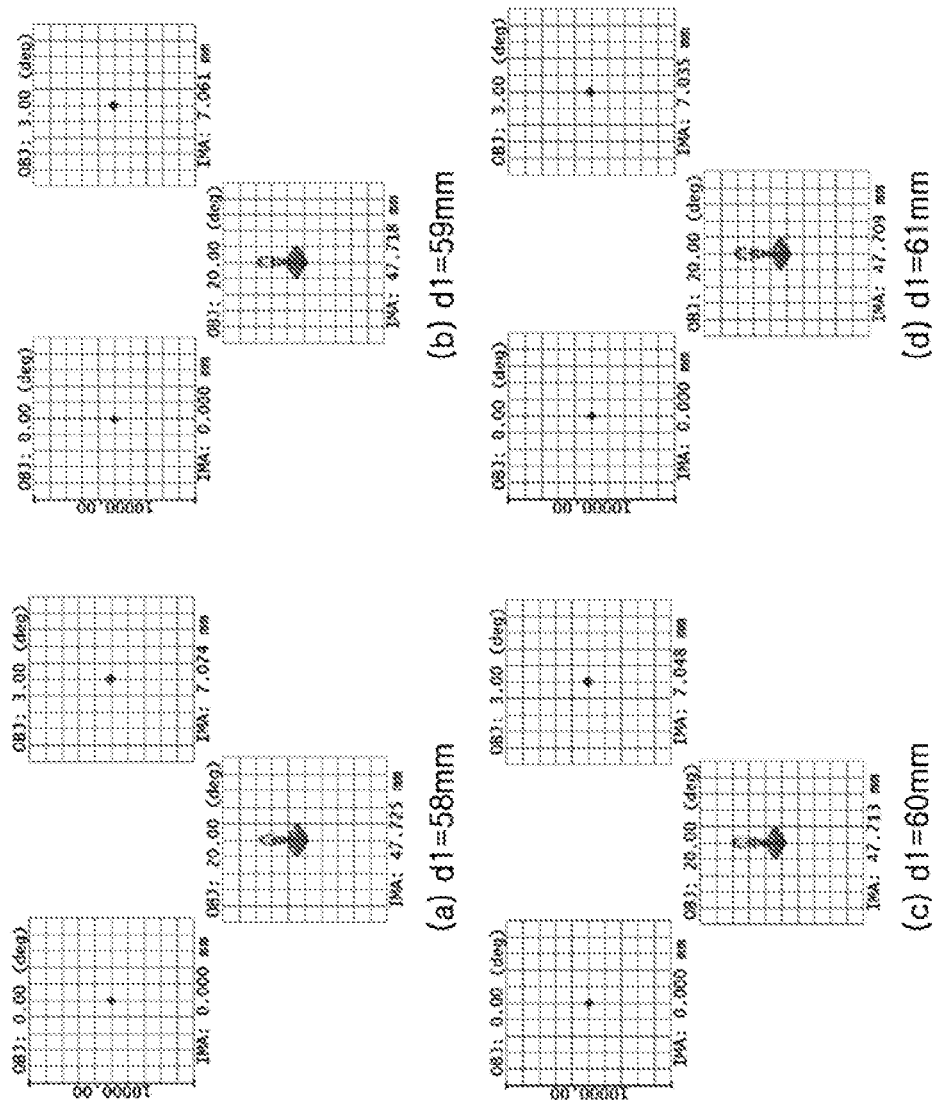

FIG. 8 is a diagram illustrating, when the second distance d2 from the first region 240 is in a range from 7 mm to 7.5 mm, diameters of the first region 240, the second region 260, and the third region 280. FIG. 8 is a diagram illustrating, when the reflection unit 300 is rotated at three degrees and twenty degrees based on the direction corresponding to the specimen, diameters of the first region 240, the second region 260, and the third region 280. Table 3 shows the diameters of the first region 240, the second region 260, and the third region 280 according to the first distance d1 shown in FIG. 6.

TABLE 3

| RMS radius (mm) | First region | Second region | Third region |
| --- | --- | --- | --- |
| d1 = 58 mm | 64.786 | 87.694 | 979.667 |
| d1 = 59 mm | 65.016 | 87.35 | 1008.35 |
| d1 = 60 mm | 65.831 | 87.378 | 1039.53 |
| d1 = 61 mm | 67.213 | 87.779 | 1073.19 |

Figure 9:
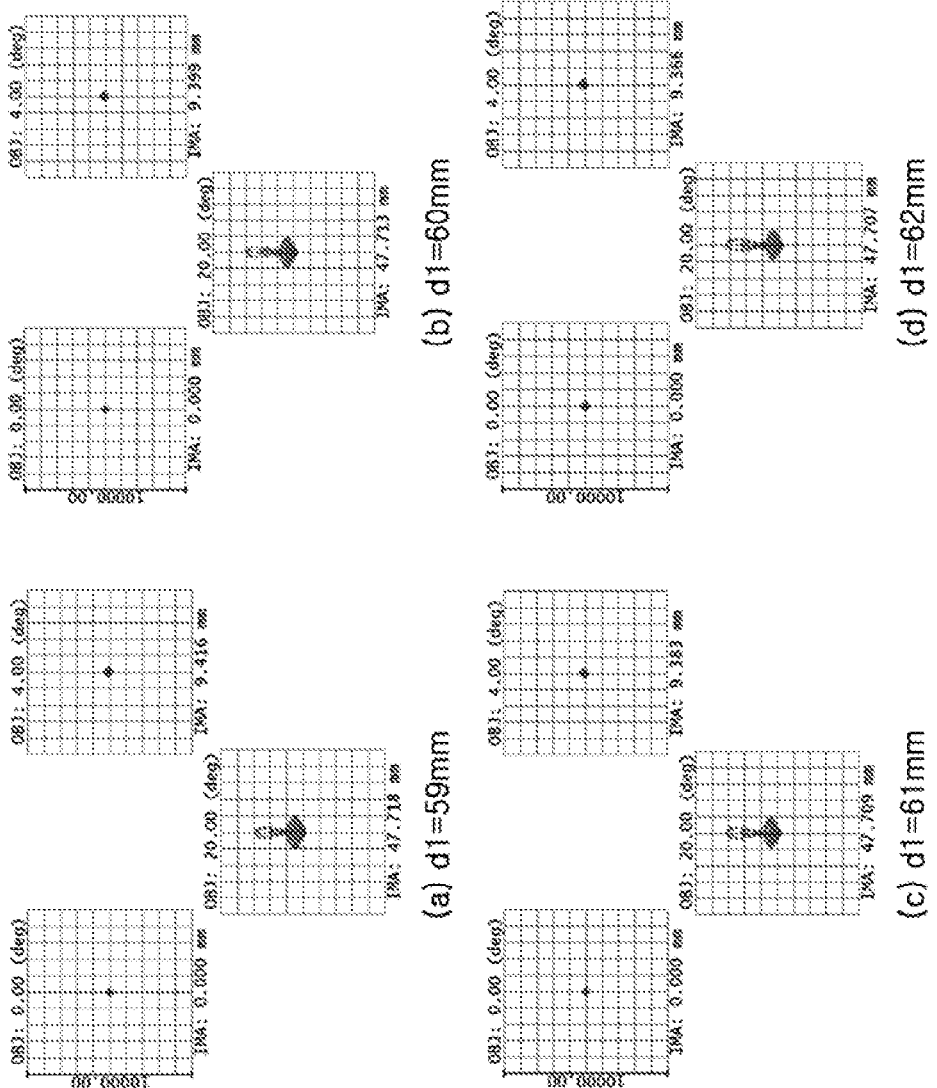

FIG. 9 is a diagram illustrating, when the second distance d2 is from the first region 240 is in a range from 9 mm to 9.5 mm, diameters of the first region 240, the second region 260, and the third region 280. FIG. 9 is a diagram illustrating, when the reflection unit 300 is rotated at four degrees and twenty degrees based on the direction corresponding to the specimen, diameters of the first region 240, the second region 260, and the third region 280. Table 4 shows the diameters of the first region 240, the second region 260, and the third region 280 according to the first distance d1 shown in FIG. 6.

TABLE 4

| RMS radius (mm) | First region | Second region | Third region |
| --- | --- | --- | --- |
| d1 = 59 mm | 65.016 | 103.058 | 1008.35 |
| d1 = 60 mm | 65.831 | 102.706 | 1039.53 |
| d1 = 61 mm | 67.213 | 102.632 | 1073.19 |
| d1 = 62 mm | 69.126 | 102.84 | 1109.29 |

In consideration of FIGS. 6 to 9 and Tables 1 to 4, regardless of a variation in the first distance d1, the first region 240, the second region 260, and the third region 280 may have a tendency in which a size of a diameter is gradually increased in the order of the first region 240, the second region 260, and the third region 280. In addition, in consideration of the third region 280 having a very large diameter when compared to the diameters of the first region 240 and the second region 260, in detecting whether the specimen 700 is defective, the specimen inspection apparatus 10 may determine whether or not a diameter is appropriate by putting a higher priority on the first region 240 and the second region 260. In addition, when the first distances d1 are the same, it can be confirmed that the first region 240 and the third region 260 have the same diameter regardless of a variation in the second distance d2. In addition, even when the first distances d1 are the same, it can be seen that the second region 260 has a different diameter as the second distance d2 is varied.

TABLE 5

| | RMS radius (mm) | | | | | | |
| --- | --- | --- | --- | --- | --- | --- | --- |
| | d1 = 56 mm | d1 = 57 mm | d1 = 58 mm | d1 = 59 mm | d1 = 60 mm | d1 = 61 mm | d1 = 62 mm |
| First region | 66.087 | 65.146 | 64.786 | 65.016 | 65.831 | 67.213 | 69.126 |

TABLE 6

| | RMS radius (mm) | | | | | | |
| --- | --- | --- | --- | --- | --- | --- | --- |
| | d1 = 56 mm | d1 = 57 mm | d1 = 58 mm | d1 = 59 mm | d1 = 60 mm | d1 = 61 mm | d1 = 62 mm |
| Third region | 929.907 | 953.511 | 979.667 | 1008.35 | 1039.53 | 1073.19 | 1109.29 |

In consideration of FIGS. 6 to 9 and Tables 1 to 4, regardless of the variation in the second distance d2, Tables 5 and 6 show the diameters of the first region 240 and the third region 280 according to the first distances d1. In consideration of Table 5, it can be seen that the first region 240 has a diameter that is gradually decreased as the first distance d1 ranges from 56 mm to 58 mm, whereas the first region 240 has a diameter that is gradually increased as the first distance d1 ranges from 58 mm to 62 mm Thus, it can be seen that a diameter value of the first region 240, which is obtained as the first distance d1 is varied from 56 mm to 62 mm, has a U-shaped curve. In addition, in consideration of Table 6, it can be seen that the third region 280 has a diameter that is gradually increased as the first distance d1 is increased.

In consideration of Table 5, the first region 240 may have an appropriate diameter with which the specimen 700 is detectable, and the appropriate diameter may be included in a range having an error range of 1.7% on the basis of a minimum value thereof. The error range may be obtained by considering that a size of the first region 240 ranges from 60 mm to 70 mm and a diameter value varied according to the first distance d1 draws a U-shaped curve. The first region 240 may be included in the range of 64.786 mm to 65.887 mm, which has an error range of 1.7%, on the basis of a minimum value of 64.786 mm. The first region 240 may have an appropriate diameter, and the appropriate diameter may range from 64.786 mm to 65.887 mm. The first distance d1 may range from 57 mm to 60 mm so as to allow the first region 240 to have an appropriate diameter. The first distance d1 may range from 57 mm to 60 mm so as to allow the first region 240 to have a diameter ranging from 64.786 mm to 65.887 mm.

When the error range is significantly different from the minimum value, the first region 240 may not have a resolution capable of determining whether the specimen is defective. Only when the first region 240 has a diameter falling within a predetermined error range from the minimum value, is it possible to determine whether the specimen is defective. The appropriate diameter of the first region 240 may be a diameter corresponding to an error range within 2% from the minimum value and, preferably, the appropriate diameter thereof may be a diameter corresponding to an error range of 1.7% from the minimum value. When the diameter of the first region 240 has a diameter that is greater than the error range of 1.7% from the minimum value, an intensity of the terahertz wave per unit area of the first region 240 may be smaller, and thus accuracy for whether the specimen is defective, which is detected in the first region 240, may be degraded.

In consideration of FIGS. 6 to 9 and Tables 1 to 4, Table 7 shows the second region 260 according to the first distance d1 and the second distance d2.

TABLE 7

| RMS radius (mm) | d1 = 56 mm | d1 = 57 mm | d1 = 58 mm | d1 = 59 mm | d1 = 60 mm | d1 = 61 mm | d1 = 62 mm |
| --- | --- | --- | --- | --- | --- | --- | --- |
| d2 = 2 mm | 68.9 | 67.946 | — | — | 68.384 | 69.623 | — |
| d2 = 5 mm | — | 75.964 | 75.426 | — | 75.764 | 76.636 | — |
| d2 = 7 mm | — | — | 87.694 | 87.35 | 87.378 | 87.779 | — |
| d2 = 9.5 mm | — | — | — | 103.058 | 102.706 | 102.632 | 102.84 |

In consideration of Table 7, it can be seen that diameter values of the second region 260, which are obtained according to the first distance d1 ranging from 56 mm to 62 mm and the second distance d2 ranging from 2 mm to 9.5 mm, have a U-shaped curve. In addition, it can be seen that, as the second distance d2 is increased, the diameter value of the second region 260 according to the first distance d1 is increased.

When the diameter values of the second region 260 formed on the basis of the minimum value has the U-shaped curve, it can be seen that the diameter value of the first distance d1, which is 1 mm smaller than the first distance having the minimum value, is significantly increased when compared to the minimum value, and the diameter value of the first distance d1, which is 1 mm to 4 mm than the first distance d1 having the minimum value, is gradually increased when compared to the minimum value. In consideration of the above description, the specimen inspection apparatus 10 may determine a range of the appropriate diameter on the basis of the diameter value of the first distance d1, which is 1 mm smaller than the first distance d1 having the minimum value of the second region 260. The appropriate diameter may be smaller than the diameter value of the first distance d1, which is 1 mm smaller than the first distance d1 having the minimum value of the second region 260.

In addition, the appropriate diameter may have a deviation ranging from 0.2% to 2% on the basis of the minimum value. The minimum value of the appropriate diameter may be varied according to the second distance, and when the minimum value of the appropriate diameter is increased, the deviation of the appropriate diameter may be set to be smaller. This is because the minimum value of the appropriate diameter is increased according to the second distance and, as the minimum value of the appropriate diameter is increased, a resolution of the appropriate diameter is further degraded. This is because, even when an intensity of the terahertz wave irradiated to the second region is the same, a minimum value of the intensity of the irradiated terahertz wave per unit area is greater than an intensity of a irradiated terahertz wave per unit area when the minimum value of the appropriate diameter of the second region is small. Thus, in consideration of the minimum value of the appropriate diameter which is increased from 64 mm to 102 mm as the second distance is increased from 2 mm to 9.5 mm, the deviation of the appropriate diameter may be considered to be decreased from 2% to 0.2%.

When the second distance d2 ranges from 2 mm to 2.5 mm, it may be considered that the second distance d2 has a diameter substantially similar to a diameter value exhibited in the first region 240. When the second distance d2 ranges from 2 mm to 2.5 mm, the second region 260 may have an appropriate diameter, and the appropriate diameter may be smaller than 68.9 mm of d1 (56 mm) that is 1 mm smaller than d1 (57 mm) having the minimum value. When the second distance d2 ranges from 2 mm to 2.5 mm, the first distance d1 may range from 57 mm to 60 mm so as to allow the second region 260 to have an appropriate diameter.

When the second distance d2 ranges from 2 mm to 2.5 mm, the appropriate diameter may be included in a range having an error range of 1.4% on the basis of the minimum value. The error range may be obtained by considering that a size of the first region 240 ranges 60 mm to 70 mm and a diameter value varied according to the first distance d1 draws a U-shaped curve. The second region 260 may be included in the range of 67.946 mm to 68.897 mm, which has an error range of 1.4%, on the basis of a minimum value of 67.946 mm. When the second distance d2 ranges from 2 mm to 2.5 mm, the second region 260 may have an appropriate diameter, and the appropriate diameter may range 67.946 mm to 68.897 mm. When the second distance d2 ranges from 2 mm to 2.5 mm, the first distance d1 may range from 57 mm to 60 mm so as to allow the second region 260 to have an appropriate diameter. When the second distance d2 ranges from 2 mm to 2.5 mm, the first distance d1 may range from 57 mm to 60 mm so as to allow the second region 260 to range from 67.946 mm to 68.897 mm.

When the error range is significantly different from the minimum value, the second region 260 may not have a resolution capable of determining whether the specimen is defective. Only when the second region 260 has a diameter falling within a predetermined error range from the minimum value, is it possible to determine whether the specimen is defective. The appropriate diameter of the second region 260 may be a diameter corresponding to an error range within 2% from the minimum value and, when the second distance d2 ranges from 2 mm to 2.5 mm, the appropriate diameter thereof may be preferably a diameter corresponding to an error range of 1.4% from the minimum value. When the second distance d2 ranges from 2 mm to 2.5 mm and when the diameter of the second region 260 has a diameter that is greater than the error range of 1.4% from the minimum value, an intensity of the terahertz wave per unit area of the second region 260 may be smaller, and thus accuracy for whether the specimen is defective, which is detected in the second region 260, may be degraded.

When the second distance d2 ranges from 4.5 mm to 5 mm, the second region 260 may have an appropriate diameter, and the appropriate diameter may be smaller than 75.964 mm of d1 (57 mm) that is 1 mm smaller than d1 (58 mm) having the minimum value. When the second distance d2 ranges from 4.5 mm to 5 mm, the first distance d1 may range from 58 mm to 60 mm so as to allow the second region 260 to have an appropriate diameter.

When the second distance d2 ranges from 4.5 mm to 5 mm, it can be seen that the second region 260 has a diameter ranging from 70 mm to 80 mm. When the second distance d2 ranges from 4.5 mm to 5 mm, in consideration of the resolution being degraded as the diameter is increased and in consideration of the diameter range of the second region 260, the appropriate diameter may be included in a range having an error range of 0.7% on the basis of the minimum value. When the second distance d2 ranges from 4.5 mm to 5 mm, the second region 260 may be included in a range of 75.426 mm to 75.954 mm, which has an error range of 0.7% on the basis of the minimum value of 75.426 mm. When the second distance d2 ranges from 4.5 mm to 5 mm, the second region 260 may have an appropriate diameter, and the appropriate diameter may range 75.426 mm to 75.954 mm. When the second distance d2 ranges from 4.5 mm to 5 mm, the first distance d1 may range from 58 mm to 60 mm so as to allow the second region 260 to have an appropriate diameter. When the second distance d2 ranges from 4.5 mm to 5 mm, the first distance d1 may range from 58 mm to 60 mm so as to allow the second region 260 to range from 75.426 mm to 75.954 mm.

When the error range is significantly different from the minimum value, the second region 260 may not have a resolution capable of determining whether the specimen is defective. Only when the second region 260 has a diameter falling within a predetermined error range from the minimum value, it is possible to determine whether the specimen is defective. The appropriate diameter of the second region 260 may be a diameter corresponding to an error range within 2% from the minimum value and, when the second distance d2 ranges from 4.5 mm to 5 mm, the appropriate diameter thereof may be preferably a diameter corresponding to an error range of 0.7% from the minimum value. When the second distance d2 ranges from 4.5 mm to 5 mm and when the diameter of the second region 260 has a diameter that is greater than the error range of 0.7% from the minimum value, an intensity of the terahertz wave per unit area of the second region 260 may be smaller, and thus accuracy for whether the specimen is defective, which is detected in the second region 260, may be degraded.

When the second distance d2 ranges from 7 mm to 7.5 mm, the second region 260 may have an appropriate diameter, and the appropriate diameter may be smaller than 87.694 mm of d1 (58 mm) that is 1 mm smaller than d1 (59 mm) having the minimum value. When the second distance d2 ranges from 7 mm to 7.5 mm, the first distance d1 may range from 59 mm to 60 mm so as to allow the second region 260 to have an appropriate diameter.

When the second distance d2 ranges from 7 mm to 7.5 mm, it can be seen that the second region 260 has a diameter ranging from 80 mm to 90 mm. When the second distance d2 ranges from 7 mm to 7.5 mm, in consideration of the resolution being degraded as the diameter is increased and in consideration of the diameter range of the second region 260, the appropriate diameter may be included in a range having an error range of 0.3% on the basis of the minimum value. When the second distance d2 ranges from 7 mm to 7.5 mm, the second region 260 may be included in a range of 87.35 mm to 87.612 mm, which has an error range of 0.3% on the basis of the minimum value of 87.35 mm. When the second distance d2 ranges from 7 mm to 7.5 mm, the second region 260 may have an appropriate diameter, and the appropriate diameter may range 87.35 mm to 87.612 mm. When the second distance d2 ranges from 7 mm to 7.5 mm, the first distance d1 may range from 59 mm to 60 mm so as to allow the second region 260 to have an appropriate diameter. When the second distance d2 ranges from 7 mm to 7.5 mm, the first distance d1 may range from 59 mm to 60 mm so as to allow the second region 260 to range from 87.35 mm to 87.612 mm.

When the error range is significantly different from the minimum value, the second region 260 may not have a resolution capable of determining whether the specimen is defective. Only when the second region 260 has a diameter falling within a predetermined error range from the minimum value, is it possible to determine whether the specimen is defective. The appropriate diameter of the second region 260 may be a diameter corresponding to an error range within 2% from the minimum value and, when the second distance d2 ranges from 7 mm to 7.5 mm, the appropriate diameter thereof may be preferably a diameter corresponding to an error range of 0.3% from the minimum value. When the second distance d2 ranges from 7 mm to 7.5 mm and when the diameter of the second region 260 has a diameter that is greater than the error range of 0.3% from the minimum value, an intensity of the terahertz wave per unit area of the second region 260 may be smaller, and thus accuracy for whether the specimen is defective, which is detected in the second region 260, may be degraded.

When the second distance d2 ranges from 9 mm to 9.5 mm, it can be seen that the second region 260 has a diameter ranging from 100 mm to 110 mm. When the second distance d2 ranges from 9 mm to 9.5 mm, in consideration of the resolution being degraded as the diameter is increased and in consideration of the diameter range of the second region 260, the appropriate diameter may be included in a range having an error range of 0.1% on the basis of the minimum value. When the second distance d2 ranges from 9 mm to 9.5 mm, the second region 260 may be included in a range of 102.632 mm to 102.735 mm, which has an error range of 0.1% on the basis of the minimum value of 102.632 mm. When the second distance d2 ranges from 9 mm to 9.5 mm, the second region 260 may have an appropriate diameter, and the appropriate diameter may range 102.632 mm to 102.735 mm. When the second distance d2 ranges from 9 mm to 9.5 mm, the first distance d1 may range from 60 mm to 61 mm so as to allow the second region 260 to have an appropriate diameter. When the second distance d2 ranges from 9 mm to 9.5 mm, the first distance d1 may range from 60 mm to 61 mm so as to allow the second region 260 to range from 102.632 mm to 102.735 mm.

When the error range is significantly different from the minimum value, the second region 260 may not have a resolution capable of determining whether the specimen is defective. Only when the second region 260 has a diameter falling within a predetermined error range from the minimum value, it is possible to determine whether the specimen is defective. The appropriate diameter of the second region 260 may be a diameter corresponding to an error range within 2% from the minimum value and, when the second distance d2 ranges from 9 mm to 9.5 mm, the appropriate diameter thereof may be preferably a diameter corresponding to an error range of 0.1% from the minimum value. When the second distance d2 ranges from 9 mm to 9.5 mm and when the diameter of the second region 260 has a diameter that is greater than the error range of 0.1% from the minimum value, an intensity of the terahertz wave per unit area of the second region 260 may be smaller, and thus accuracy for whether the specimen is defective, which is detected in the second region 260, may be degraded.

Thus, when the second distance d2 ranges from 2 mm to 2.5 mm, the first distance d1 may range from 57 mm to 60 mm so as to allow the second region 260 to have an appropriate diameter. When the second distance d2 ranges from 4.5 mm to 5 mm, the first distance d1 may range from 58 mm to 60 mm so as to allow the second region 260 to have an appropriate diameter. When the second distance d2 ranges from 7 mm to 7.5 mm, the first distance d1 may range from 59 mm to 60 mm so as to allow the second region 260 to have an appropriate diameter. When the second distance d2 ranges from 9 mm to 9.5 mm, the first distance d1 may range from 60 mm to 61 mm so as to allow the second region 260 to have an appropriate diameter. In consideration of the second distance d2 and the diameter of the second region 260, a case in which the first distance d1 is 60 mm may be the most optimal first distance d1.

The specimen inspection apparatus 10 may vary at least one of the first distance d1 and the second distance d2 according to the size of the specimen 700. The specimen inspection apparatus 10 may vary the second distance d2 according to the size of the specimen 700. In the specimen inspection apparatus 10, as the second distance d2 is increased, a region in which a defective region of the specimen is detectable may be increased. The specimen inspection apparatus 10 may have a plurality of irradiation regions, each having an appropriate diameter allowing a defective region of the specimen to be detected on the basis of at least one of the first distance d1 and the second distance d2. The specimen inspection apparatus 10 may have a plurality of irradiation regions, each having an appropriate diameter allowing a defective region of the specimen to be detected on the basis of at least one of the first distance d1 and the second distance d2. An inspection region of the specimen inspection apparatus 10 may include a plurality of irradiation regions, each having an appropriate diameter allowing a defective region of the specimen to be detected.

Figure 10:
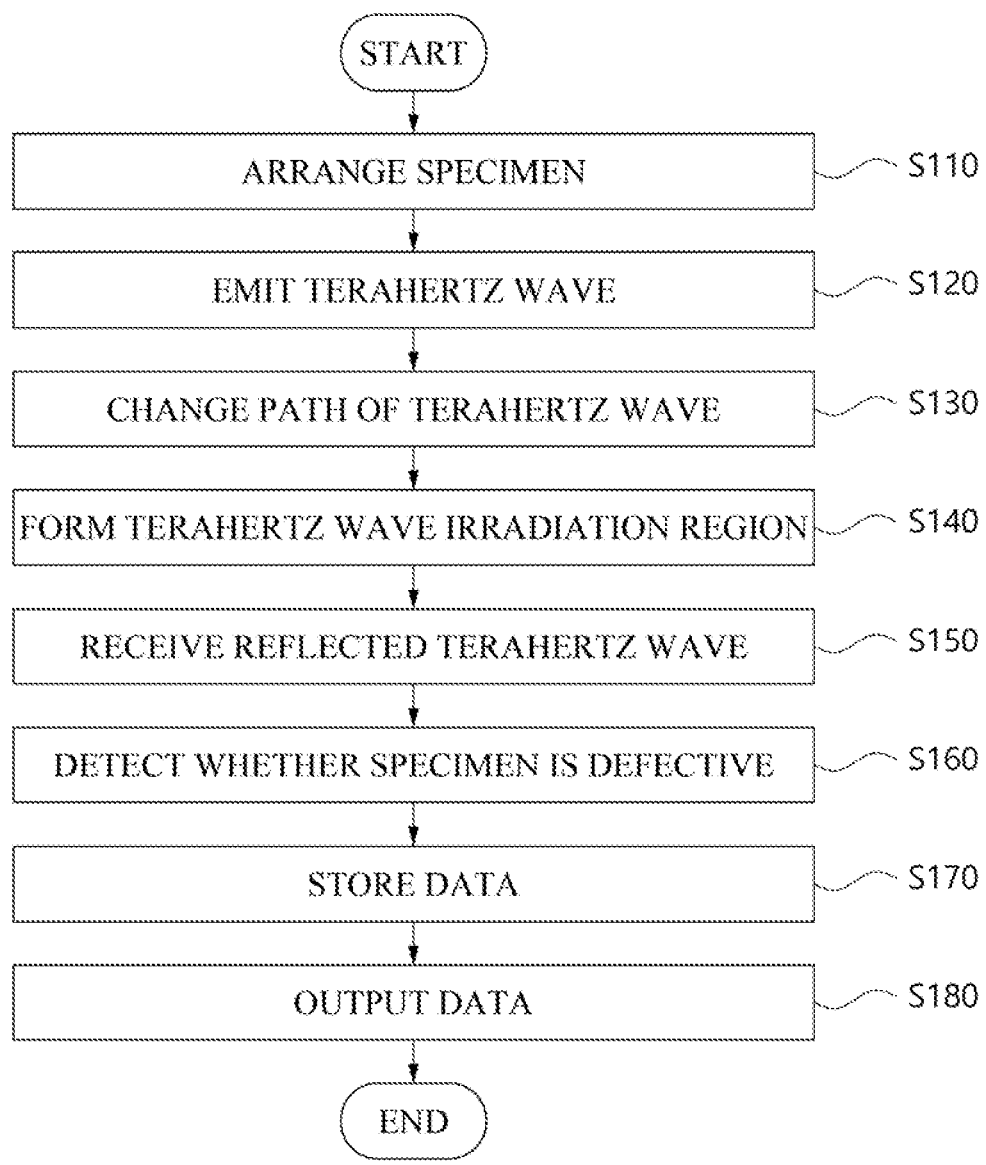
FIG. 10 is a flowchart illustrating a specimen inspection method according to one embodiment.

Hereinafter, a specimen inspection method according to one embodiment of the present invention will be described. FIG. 10 is a flowchart illustrating a specimen inspection method according to one embodiment. Referring to FIGS. 1 to 10, the specimen inspection method according to one embodiment of the present invention may include arranging a specimen (S110), emitting a terahertz wave (S120), changing a path of the terahertz wave (S130), forming an irradiation region of the terahertz wave (S140), receiving a reflected terahertz wave (S150), detecting whether the specimen is defective (S160), storing data (S170), and outputting the data (S180).

In the arranging of the specimen (S110), the specimen 700 may be disposed on a tray. In the arranging of the specimen (S110), the specimen 700 may be disposed on the tray at a position corresponding to the specimen inspection apparatus 10. The specimen may be provided as a plurality of specimens.

In the emitting of the terahertz wave (S120), the emission unit 200 may irradiate the terahertz wave to the specimen 700. In the emitting of the terahertz wave (S120), the emission unit 200 may irradiate the terahertz wave to the reflection unit 300.

In the changing of the path of the terahertz wave (S130), the path of the terahertz wave 210 emitted from the emission unit 200 may be changed by the reflection unit 300. In the changing of the path of the terahertz wave (S130), the path of the terahertz wave 210 emitted from the emission unit 200 may be changed by the reflection unit 300, which is rotated at a predetermined angle, and thus the terahertz wave 210 may be irradiated to the specimen 700. In the changing of the path of the terahertz wave (S130), the path of the terahertz wave 210 emitted from the emission unit 200 may be changed by the reflection unit 300, which is rotated at a predetermined angle, and thus the terahertz wave 210 may be irradiated to the focus adjusting unit 400.

In the forming of the irradiation region of the terahertz wave (S140), the focus adjusting unit 400 may adjust a focus of the terahertz wave, whose path is changed by the reflection unit 300 and which is irradiated, to form an irradiation region on the specimen 700. In the forming of the irradiation region of the terahertz wave (S140), the focus adjusting unit 400 may adjust a focus of the terahertz wave, whose path is changed by the reflection unit 300 and which is irradiated, to form a plurality of irradiation regions, which are vertically irradiated, on the specimen 700.

In the receiving of the reflected terahertz wave (S150), the reception unit 600 may receive the reflected terahertz wave formed by the terahertz wave being irradiated to the specimen 700 and then reflected therefrom. In the receiving of the reflected terahertz wave (S150), the reception unit 600 may receive a variation in intensity of the reflected terahertz wave formed by the terahertz wave being irradiated to the specimen 700 and then reflected therefrom.

In the detecting of whether the specimen is defective (S160), the control unit 100 may detect whether the specimen is defective on the basis of the reflected terahertz wave received by the reception unit 600. In the detecting of whether the specimen is defective (S160), the control unit 100 may detect whether the specimen is defective on the basis of a variation in intensity of the reflected terahertz wave received by the reception unit 600. In the detecting of whether the specimen is defective (S160), the control unit 100 may detect a defective region included in the specimen on the basis of the variation in intensity of the reflected terahertz wave received by the reception unit 600.

In the storing of the data S170, data on whether the specimen 700 is defective, which is determined by the control unit 100, may be stored. In the storing of the data S170, data on a defective region included in the specimen 700, which is determined by the control unit 100, may be stored. In the storing of the data S170, coordinate data on the defective region included in the specimen 700, which is determined by the control unit 100, may be stored.

In the outputting of the data (S180), data on whether the specimen 700 is defective may be output. In the outputting of the data (S180), data on a defective region included in the specimen 700 may be output. In the outputting of the data (S180), coordinate data on the defective region included in the specimen 700 may be output.

Figure 11:
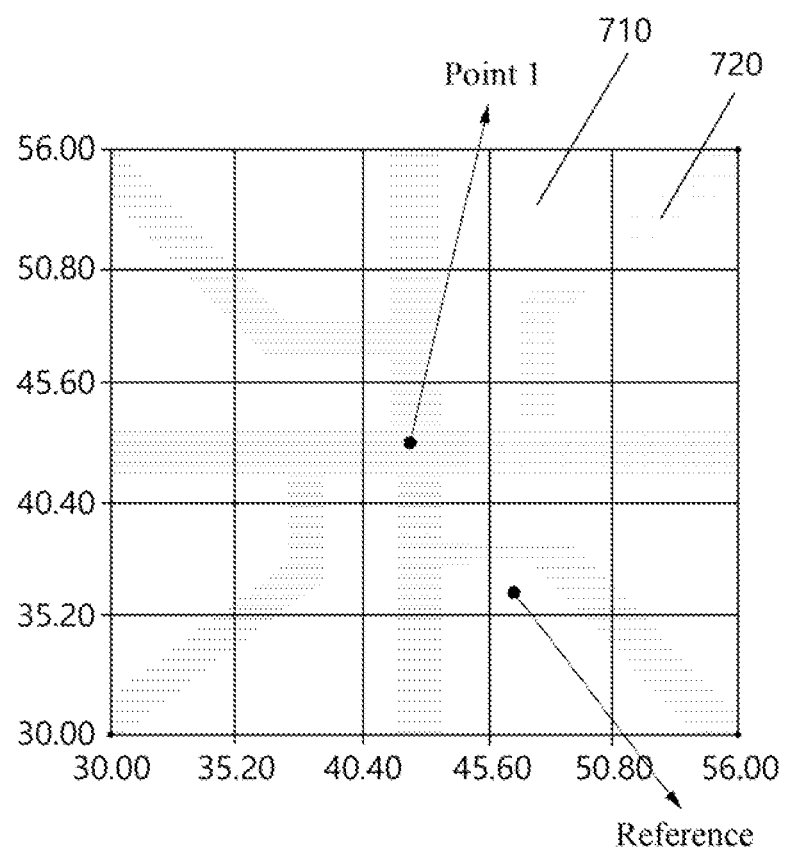
FIGS. 11 and 12 are diagrams illustrating a method of detecting whether a transparent electrode is defective in the specimen inspection apparatus according to one embodiment.
Figure 12:
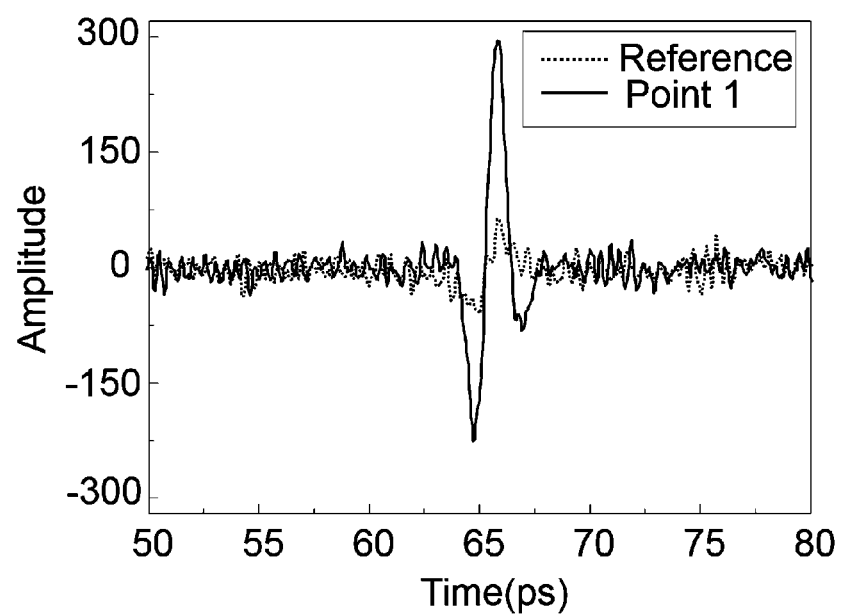
Figure 13:
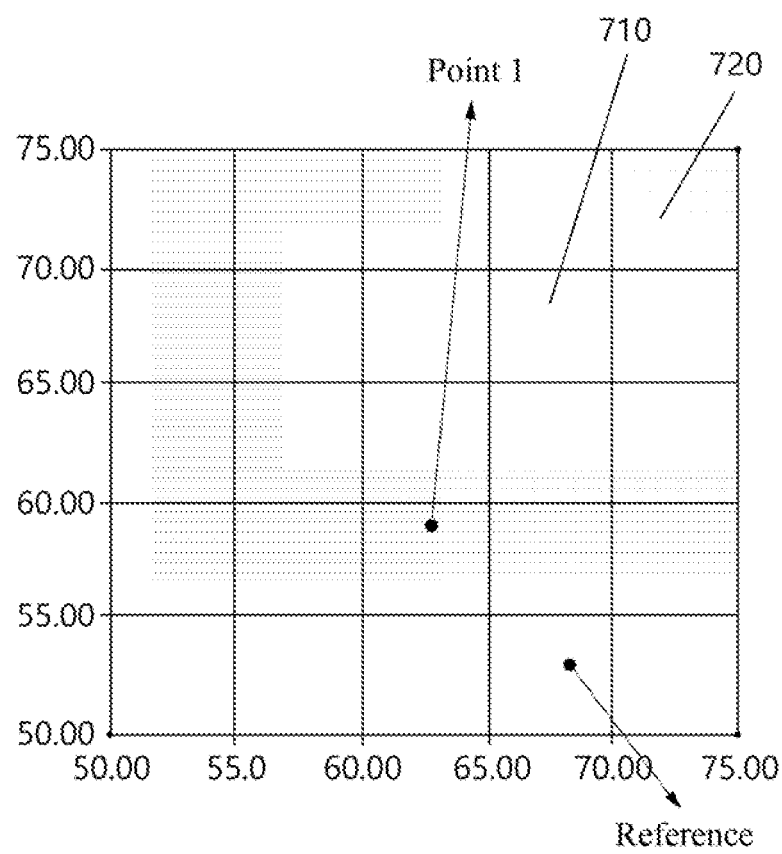
FIGS. 13 and 14 are diagrams illustrating a method of detecting whether a transparent electrode is defective in the specimen inspection apparatus according to one embodiment.
Figure 14:
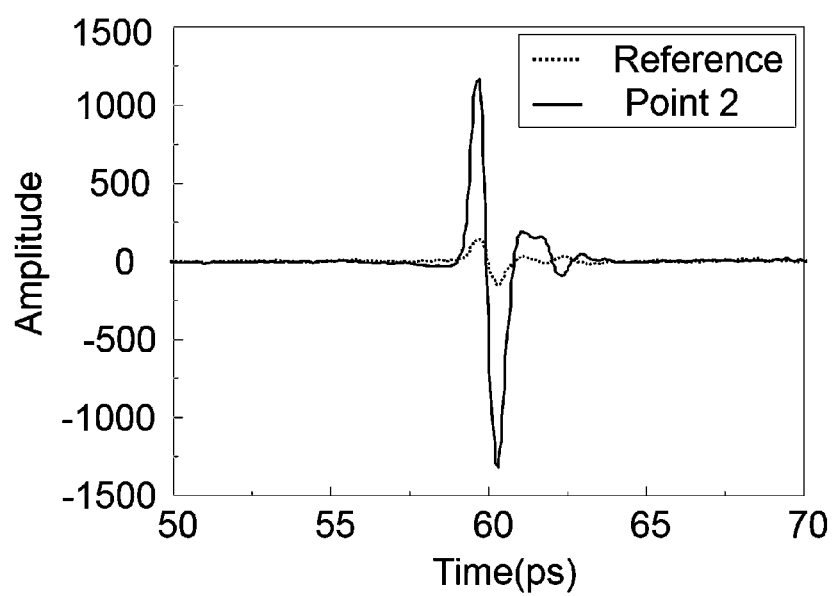

Hereinafter, a specimen inspection method in which the specimen inspection apparatus 10 detects whether a transparent electrode is defective according to one embodiment of the present invention will be described. FIGS. 11 and 12 are diagrams illustrating a method of detecting whether a transparent electrode is defective in the specimen inspection apparatus 10 according to one embodiment. FIGS. 13 and 14 are diagrams illustrating a method of detecting whether a transparent electrode is defective in the specimen inspection apparatus 10 according to one embodiment.

Referring to FIGS. 11 and 13, when the specimen 700 is a transparent electrode, the specimen 700 may include a substrate 710 and a metal material 720. The specimen inspection apparatus 10 may inspect the metal material 720 formed on a surface of the substrate 710. The specimen inspection apparatus 10 may inspect a pattern and quality of the metal material 720 formed on the surface of the substrate 710.

Referring to FIGS. 12 and 14, FIG. 12 illustrates a variation in intensity of a terahertz wave for the specimen 700 shown in FIG. 11, and FIG. 14 illustrates a variation in the intensity of a terahertz wave for the specimen 700 shown in FIG. 13. When the specimen 700 is a transparent electrode, it is possible to determine whether the specimen 700 is defective by comparing the intensities of the terahertz waves between the substrate 710 and the metal material 720.

The substrate 710 may be a transparent polymer substrate. The substrate 710 may be glass or quartz. The metal material 720 may be one among ITO, IZO, fluorine-doped tin oxide, metal nanowires (silver nanowires, copper nanowires, nickel nanowires, or the like), or the like. The specimen 700 may be an electronic element or a transparent electrode of which the substrate 710 is coated with the metal material 720.

The specimen 700 may include the substrate 710 and the metal material 720, and reflectivity of the metal material 720 may be greater than reflectivity of the substrate 710. When the specimen 700 is a transparent electrode, the reflectivity of the metal material 720 is greater than the reflectivity of the substrate 710, and thus the intensities of the terahertz waves between the substrate 710 and the metal material 720 may be compared. Referring to FIGS. 11 to 14, an intensity of the terahertz wave in the substrate 710 (Reference) may be compared with an intensity of the terahertz wave in the metal material 720 (Point 1 or Point 2). In consideration of FIGS. 12 and 14, since the intensity of the terahertz wave in the metal material 720 (Point 1 or Point 2) is greater than the intensity of the terahertz wave in the substrate 710 (Reference), the specimen inspection apparatus 10 may detect whether the specimen 700 is defective or detect a defective region of the specimen.

Consequently, the specimen inspection apparatus 10 may image the specimen 700 by comparing the intensity of the reflected terahertz wave in the substrate 710 with the intensity of the reflected terahertz wave in the metal material 720. In addition, the specimen inspection apparatus 10 may inspect whether the specimen 700 is defective with a higher resolution by comparing the intensity of the reflected terahertz wave in the substrate 710 with the intensity of the reflected terahertz wave in the metal material 720 on the basis of the plurality of irradiation regions, each having the appropriate diameter. In addition, the specimen inspection apparatus 10 may further accurately inspect whether the specimen 700 is defective by varying the first distance d1 and the second distance d2 to have the appropriate diameter and comparing the intensity of the reflected terahertz wave in the substrate 710 with the intensity of the reflected terahertz wave in the metal material 720, wherein the intensities are obtained on the basis of the plurality of irradiation regions, each having the appropriate diameter.

As described above, although the embodiments have been described with reference to specific embodiments and the accompanying drawings, various alterations and modifications can be derived by those skilled in the art from the above description of the present invention. For example, it should be understood that an appropriate result may be achieved even when the techniques described herein are performed in a different order than the described methods, and/or that components of the described systems, structures, devices, circuits, and the like are coupled or combined in a form different from the described methods, or substituted or replaced with other components or equivalents.

Therefore, other embodiments, other embodiments, and equivalents to the claims are within the scope of the following claims.

The invention claimed is:

1. A specimen inspection apparatus comprising:
one or more light sources configured to irradiate terahertz waves;
a mirror configured to change a path of the terahertz waves irradiated from the one or more light sources;
one or more lenses configured to form a first region on a specimen along the path of the terahertz waves, wherein a distance between the mirror and the one or more lenses is a first distance, the first region includes a second region and a third region, and the second region is spaced apart from the third region by a second distance;
a sensor configured to receive the terahertz waves, which are irradiated onto the first region and respectively reflected from the specimen; and
a processor configured to control at least one of the first distance and the second distance and detect whether the specimen is defective according to a difference between reflectivity of the terahertz waves,
wherein, when the first distance ranges from 57 mm to 61 mm, the second region has a diameter ranging from 64 mm to 67 mm, and the third region respectively has an appropriate diameter,
wherein the appropriate diameter refers to a diameter allowing the detection of whether or not the specimen is defective.

2. The specimen inspection apparatus of claim 1, wherein the appropriate diameter has a deviation ranging from 0.2% to 2% on the basis of a minimum value thereof.

3. The specimen inspection apparatus of claim 2, wherein the appropriate diameter of the third region ranges from 67.5 mm to 68.5 mm.

4. The specimen inspection apparatus of claim 2, wherein, when the first distance ranges from 58 mm to 60 mm, the appropriate diameter of the third region ranges from 67.5 mm to 68.5 mm or from 75.4 mm to 75.8 mm.

5. The specimen inspection apparatus of claim 2, wherein, when the first distance ranges from 59 mm to 60 mm, the appropriate diameter of the third region ranges from 67.5 mm to 68.5 mm, from 75.4 mm to 75.8 mm, or from 87 mm to 87.6 mm.

6. The specimen inspection apparatus of claim 2, wherein, when the first distance is 60 mm, the appropriate diameter of the third region ranges from 68 mm to 103 mm.

7. The specimen inspection apparatus of claim 2, wherein, when the first distance ranges from 60 mm to 61 mm, the appropriate diameter of the third region ranges from 102.5 mm to 102.8 mm.

8. The specimen inspection apparatus of claim 2, wherein a light source of the terahertz waves is a continuous-type or pulsed-type.

9. The specimen inspection apparatus of claim 2, wherein a wavelength of the terahertz waves ranges from 30 μm to 3 mm.

10. The specimen inspection apparatus of claim 2, wherein the second distance is determined based on an angle at which the mirror is rotated according to a signal from the processor.

11. The specimen inspection apparatus of claim 2, wherein:
the specimen includes an electronic element or a transparent electrode; and
the electronic element or the transparent electrode includes any one of a transparent polymer substrate, glass, and quartz which are coated with a metal material.

12. The specimen inspection apparatus of claim 11, wherein the metal material includes at least one of indium tin oxide, indium zinc oxide, fluorine-doped tin oxide, and metal nanowires.

13. A specimen inspection method comprising:
irradiating, by one or more light sources, terahertz waves;
changing, via a mirror, a path of the terahertz waves irradiated from the one or more light sources;
forming, via one or more lenses, a first region on a specimen using the terahertz waves, wherein a distance between the mirror and the one or more lenses is a first distance, the first region includes a second region and a third region, and the second region is spaced apart from the third region by a second distance;

receiving, via a sensor, the terahertz waves, which are irradiated onto the first region and respectively reflected from the specimen; and controlling, via a processor, at least one of the first distance and the second distance and detecting whether the specimen is defective according to a difference between reflectivity of the terahertz waves, wherein, when the first distance ranges from 57 mm to 61 mm, the second region has a diameter ranging from 64 mm to 67 mm, and the third region respectively has an appropriate diameter, wherein the appropriate diameter refers to a diameter allowing the detection of whether or not the specimen is defective.

* * * * *